United States Patent [19]

Nukada et al.

[11] Patent Number: 5,604,064

[45] Date of Patent: Feb. 18, 1997

[54] CHARGE-TRANSPORTING POLYMER AND ORGANIC ELECTRONIC DEVICE USING THE SAME

[75] Inventors: Katsumi Nukada; Akira Imai; Masahiro Iwasaki; Ryosaku Igarashi, all of Minami Ashigara, Japan

[73] Assignee: Fuji Xerox Co., Ltd., Tokyo, Japan

[21] Appl. No.: 461,432

[22] Filed: Jun. 5, 1995

Related U.S. Application Data

[63] Continuation-in-part of Ser. No. 409,517, Mar. 24, 1995, abandoned.

[30] Foreign Application Priority Data

| Jun. 10, 1994 | [JP] | Japan | 6-151776 |
| May 19, 1995 | [JP] | Japan | 7-144240 |
| Aug. 23, 1994 | [JP] | Japan | 6-219599 |
| Jan. 20, 1995 | [JP] | Japan | 7-24484 |

[51] Int. Cl.$^6$ ............ G03G 5/087; H01L 31/08
[52] U.S. Cl. ............ 430/59; 525/439; 430/96
[58] Field of Search ............ 525/439; 430/69, 430/96, 59

[56] References Cited

U.S. PATENT DOCUMENTS

| 4,801,517 | 1/1989 | Frechet et al. | 430/59 |
| 4,806,443 | 2/1989 | Yanus et al. | 430/56 |
| 4,806,444 | 2/1989 | Yanus et al. | 430/56 |
| 4,937,165 | 6/1990 | Ong et al. | 430/59 |
| 4,959,288 | 9/1990 | Ong et al. | 430/59 |
| 4,983,482 | 1/1991 | Ong et al. | 430/59 |
| 5,034,296 | 7/1991 | Ong et al. | 430/59 |
| 5,080,989 | 1/1992 | Gruenbaum et al. | 430/58 |
| 5,149,609 | 9/1992 | Yu et al. | 430/58 |

FOREIGN PATENT DOCUMENTS

| 59-28903 | 7/1984 | Japan . |
| 61-20953 | 1/1986 | Japan . |
| 1-134462 | 5/1989 | Japan . |
| 1-134457 | 5/1989 | Japan . |
| 1-134456 | 5/1989 | Japan . |
| 4-133066 | 5/1992 | Japan . |
| 4-133065 | 5/1992 | Japan . |
| 1603663 | 11/1981 | United Kingdom . |
| 2261669 | 5/1993 | United Kingdom . |

OTHER PUBLICATIONS

Lecture Meeting of the Applied Physics Asociation, 37th,, Preprints of Papers, 31p–K–12 (1990).
The Sixth International Congress on Advances in Non–Impact Printing Technologies, pp. 306–311, (1990).

English–language abstract of Japanese Patent No. 5263007 from Patent Abstracts of Japan, vol. 18, No. 40 (Jan. 1994).

*Primary Examiner*—John Goodrow
*Attorney, Agent, or Firm*—Oliff & Berridge

[57] ABSTRACT

A charge-transporting polymer which is excellent in solubility and film-forming property and usable in producing various organic electron devices and whose ionization potential is controllable, and an organic electronic device, in particular electrophotographic photoreceptor, containing the same are disclosed; the charge-transporting polymer being represented by formula (I-1) or (I-2)

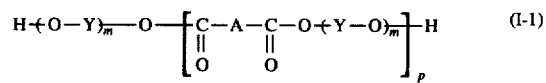

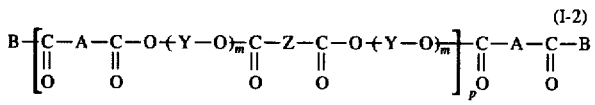

wherein Y represents a divalent hydrocarbon group; Z represents a divalent hydrocarbon group; A represents a group represented by formula (II)

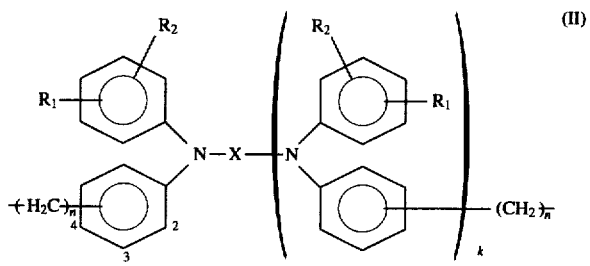

(wherein $R_1$ and $R_2$ each represents a hydrogen atom, an alkyl group, an alkoxy group, a substituted or unsubstituted aryl group, a substituted amino group, or a halogen atom, X represents a substituted or unsubstituted divalent aryl group, n represents an integer of 1 to 5, and k is 0 or 1); B represents a group represented by —O—(Y—O)$_m$—H or —O—(Y—O)$_m$—CO—Z—CO—OR' (wherein R' represents a hydrogen atom, an alkyl group, a substituted or unsubstituted aryl group, or a substituted or unsubstituted aralkyl group); m represents an integer of 1 to 5; and p represents an integer of 5 to 5,000.

7 Claims, 16 Drawing Sheets

5,604,064

CHARGE-TRANSPORTING POLYMER AND ORGANIC ELECTRONIC DEVICE USING THE SAME

CROSS-REFERENCE TO RELATED APPLICATIONS

This is a continuation-in-part application of Ser. No. 08/409,517 filed Mar. 24, 1995, now abandoned.

FIELD OF THE INVENTION

The present invention relates to a novel charge-transporting polymer. The present invention also relates to an organic electronic device using the novel charge-transporting polymer, in particular to an electrophotographic photoreceptor using the same.

BACKGROUND OF THE INVENTION

Charge-transporting polymers such as poly(vinyl-carbazole) (PVK) are promising materials for use as a photoconductive material for electrophotographic photoreceptors or as an organic electroluminescent element material, as described in *Lecture Meeting of the Applied Physics Association*, 37th., *Preprints of Papers*, 31p-K-12 (1990). In both of these applications, a charge-transporting polymer is used in the form of a charge transport layer. Well known materials for forming a charge transport layer include charge-transporting polymers such as PVK and low-molecular weight compound dispersions composed of a charge-transporting low-molecular weight compound dispersed in a polymer. In organic electroluminescent elements, a vapor-deposited low-molecular weight charge transport material is generally used. Of these charge transport materials, the low-molecular weight compound dispersions are mainly used especially in electrophotographic photoreceptors because they have an advantage that a variety of materials can be used so that highly functional devices are apt to be obtained.

Electrophotographic photoreceptors have come to be used also in high-speed copiers and printers with the recent trend toward performance increase in organic photoreceptors. However, the current performance of electrophotographic photoreceptors is insufficient for use in high-speed copiers and printers. With respect to organic photoreceptors, in particular, it is desired to further prolong the life thereof. One of the determinative factors of the life of an organic photoreceptor is the wear of the charge transport layer. The recent low-molecular weight compound dispersion type charge transport layers, which are mainly used at present, exhibit fully satisfactory performance with respect to electrical properties. However, such charge transport layers still have a drawback that since they are composed of a dispersion of a low-molecular weight compound in a polymer, they essentially have poor mechanical strength and hence poor resistance to wear. In the case of organic electroluminescent elements, there is a drawback that the low-molecular weight charge transport material melts due to the Joule's heat generated therein and undergoes crystallization, etc., and this tends to result in a morphological change of the film.

On the other hand, charge-transporting polymers have been intensively studied at present, because there is the possibility that the above-described drawbacks might be obviated with these polymers. For example, a polycarbonate obtained by polymerizing a specific dihydroxyarylamine with a bischloroformate is disclosed in U.S. Pat. No. 4,806,443, while a polycarbonate obtained by polymerizing a specific dihydroxyarylamine with phosgene is disclosed in U.S. Pat. No. 4,806,444. In U.S. Pat. No. 4,801,517 is disclosed a polycarbonate obtained by polymerizing a bishydroxyalkylarylamine with either a bischloroformate or phosgene. In U.S. Pat. Nos. 4,937,165 and 4,959,288 is disclosed a polycarbonate obtained by polymerizing a specific dihydroxyarylamine or bishydroxyalkylarylamine with a bischloroformate or a polyester obtained by polymerizing the specific amine with a bisacyl halide. Further, a polycarbonate or polyester obtained from an arylamine having a specific fluorene skeleton is disclosed in U.S. Pat. No. 5,034,296, and a polyurethane is disclosed in U.S. Pat. No. 4,983,482. Furthermore, polyesters having a backbone comprising units of a specific bisstyrylbisarylamine are disclosed in JP-B-59-28903, wherein the polyesters are used for sensitization in the form of an eutactic crystal complex formed with a pyrylium pigment salt. (The term "JP-B" as used herein means an "examined Japanese patent publication".) Moreover, polymers having a charge-transporting substituent such as a hydrazone or a triarylamine as pendant groups and photoreceptors using these polymers are proposed, for example, in JP-A-61-20953, JP-A-1-134456, JP-A-1-134457, JP-A-1-134462, JP-A-4-133065, and JP-A-4-133066. (The term "JP-A" as used herein means an "unexamined published Japanese patent application".) Of these polymers, the polymer having a tetraarylbenzidine skeleton is especially suitable for practical use because it has high mobility as reported in *The Sixth International Congress on Advances in Non-impact Printing Technologies*, 306 (1990).

Charge-transporting polymers are required to have various properties including solubility, mobility, and matching in oxidation potential. A generally employed technique for satisfying these requirements is to incorporate a substituent to control properties. Since the ionization potential of charge-transporting polymer is mostly determined by the charge-transporting monomer(s), it is important to use charge-transporting monomers whose ionization potentials are controllable. Monomers used as a starting material for the triarylamine polymers mentioned above are roughly classified into two groups, (1) dihydroxyarylamines and (2) bishydroxyalkylarylamines. However, the dihydroxyarylamines are susceptible to oxidation because of the possession of an aminophenol structure and are hence difficult to purify. In addition, although the dihydroxyarylamines are more instable especially when they have a para-hydroxy-substituted structure, it is difficult to control the ionization potential thereof by changing the positions of the substituents. A further problem of the dihydroxyarylamines is that since they have a structure in which the oxygen atoms of the substituents are directly bonded to the aromatic ring, they tend to have an inhomogeneous charge distribution due to the electron-withdrawing nature of the oxygen atoms and are hence apt to have reduced mobility. On the other hand, the bishydroxyalkylarylamines have an advantage that the influence of electron-withdrawal by the oxygen atoms is eliminated due to the alkylene groups, but have a drawback that monomer synthesis is difficult. That is, the reaction of either a diarylamine or a diarylbenzidine with 3-bromoiodobenzene tends to yield a reaction product in the form of a mixture because both the bromine and the iodine are reactive, resulting in a reduced yield. Another problem is that both the alkyllithium used for displacing bromine with lithium and ethylene oxide are highly dangerous and toxic and care should be taken in handling these.

SUMMARY OF THE INVENTION

The present invention provides a novel charge-transporting polymer with which the above-described problems can be eliminated.

That is, an object of the present invention is to provide a novel charge-transporting polymer which is excellent in solubility and film-forming property, can be easily synthesized, can have a controlled ionization potential, and is effective when used in various organic electronic devices.

Another object of the present invention is to provide an organic electronic device containing the novel charge-transporting polymer.

Still another object of the present invention is to provide an electrophotographic photoreceptor using the novel charge-transporting polymer.

As a result of intensive studies made by the present inventors in order to eliminate the above-described drawbacks, it has been found that a novel charge-transporting polymer represented by formula (I-1) or (I-2) described below is excellent in charge-transporting property and resistance to mechanical wear and that organic electronic devices, in particular electrophotographic photoreceptors, using this polymer can attain high durability. The present invention has been achieved based on these findings.

The charge-transporting polymer of the present invention is represented by formula (I-1) or (I-2)

$$H\text{+}O\text{—}Y)_{\overline{m}}\text{—}O\text{—}\left[\begin{array}{c}C\text{—}A\text{—}C\text{—}O\text{+}Y\text{—}O)_{\overline{m}}\\ \parallel\phantom{A}\parallel\\ O\phantom{A}O\end{array}\right]_p\text{—}H \quad (I\text{-}1)$$

$$B\text{—}\left[\begin{array}{c}C\text{—}A\text{—}C\text{—}O\text{+}Y\text{—}O)_{\overline{m}}C\text{—}Z\text{—}C\text{—}O\text{+}Y\text{—}O)_{\overline{m}}\\ \parallel\phantom{A}\parallel\phantom{AAAA}\parallel\phantom{A}\parallel\\ O\phantom{A}O\phantom{AAAA}O\phantom{A}O\end{array}\right]_p\text{—}C\text{—}A\text{—}C\text{—}B \quad (I\text{-}2)$$

wherein Y represents a divalent hydrocarbon group; Z represents a divalent hydrocarbon group; A represents a group represented by formula (II)

(II) [structural formula showing diphenylamine-based group with substituents $R_1$, $R_2$, linker X, with $+H_2C)_{\overline{n}}$ on one side and $(CH_2)_{\overline{n}}$ on the other, with subscripts 3, 2, 4, k]

(wherein $R_1$ and $R_2$ each represents a hydrogen atom, an alkyl group, an alkoxy group, a substituted or unsubstituted aryl group, a substituted amino group, or a halogen atom, X represents a substituted or unsubstituted divalent aryl (i.e., arylenyl) group, n represents an integer of 1 to 5, and k is 0 or 1); B represents a group represented by —O—(Y—O)$_m$—H or —O—(Y—O)$_m$—CO—Z—CO—OR' (wherein R' represents a hydrogen atom, an alkyl group, a substituted or unsubstituted aryl group, or a substituted or unsubstituted aralkyl group); m represents an integer of 1 to 5; and p represents an integer of 5 to 5,000. The plurality of each of Y, Z, A, B, R', X, $R_1$, $R_2$, m and n in formula (I-1) or (I-2) may be the same as or different from each other.

DETAILED DESCRIPTION OF THE INVENTION

Figure 1:
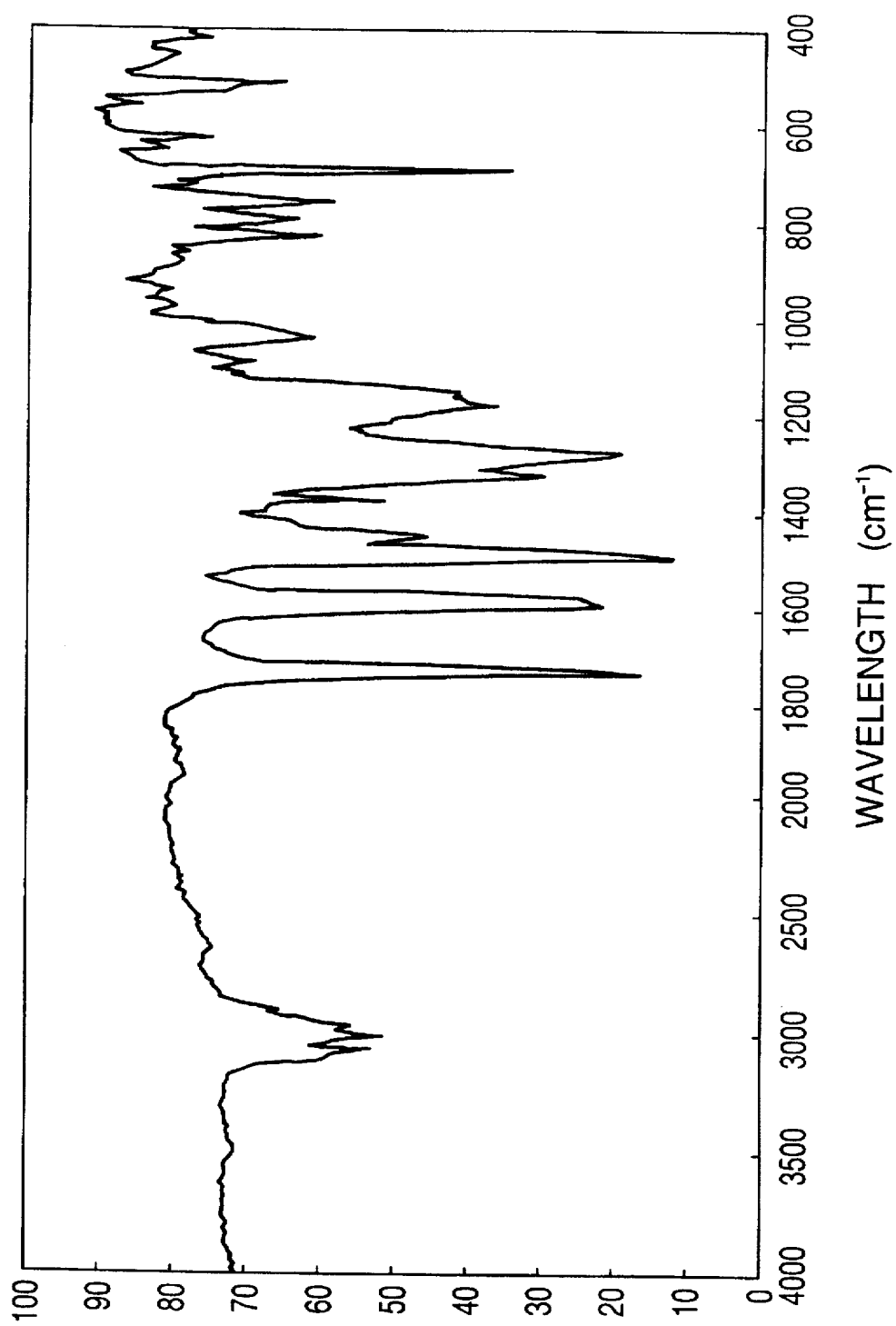
FIG. 1 is an IR spectrum of N,N'-diphenyl-N,N'-bis[3-(2-ethoxycarbonylethyl)phenyl]-[1,1'-biphenyl]-4,4'-diamine.

In formula (II), the alkyl group and the alkoxy group for $R_1$ and $R_2$ preferably have up to 5 carbon atoms and more preferably from 1 to 3 carbon atoms, and examples of the substituted amino group for $R_1$ and $R_2$ include dimethylamino, diethylamino, dipropylamino and diphenylamino groups. Further, when X represents a substituted arylenyl group, the substituent thereof may be an alkyl or alkoxy group preferably having up to 4 carbon atoms, a substituted or unsubstituted phenyl group, a substituted or unsubstituted aralkyl group, or a halogen atom, and the arylene group may have up to 6 substituents.

The alkyl group and the aralkyl group for R' in the group B preferably have from 1 to 5 carbon atoms and from 7 to 12 carbon atoms, respectively. Examples of substituents if any on the aryl or aralkyl group for R' include mono-, di- or trimethyl, ethyl, phenyl, dimethylamino, diethylamino, and dipropylamino groups.

Preferred examples of X in formula (II) are those described below:

(1) [structure with $R_4$, $R_3$, $R_{5'}$]

(2) [structure with $R_6$, $R_6$]

(3) [structure with $R_7$]

-continued

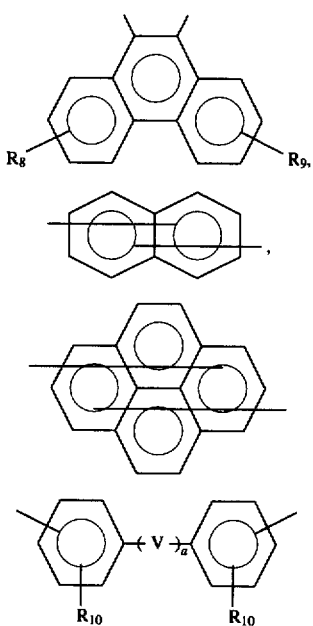

wherein V represents an atom or group selected from
—(—CH$_2$—)$_b$—, —C(CH$_3$)$_2$—, —O—, —S—,

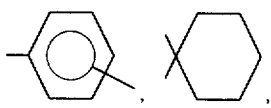

—C(CF$_3$)$_2$—, —Si(CH$_3$)$_2$—, —CH=CH—, and

a is 0 or 1, b is an integer of from 1 to 10, and c is an integer of 1 to 3; R$_3$ represents a hydrogen atom, an alkyl group having up to 4 carbon atoms, a substituted or unsubstituted phenyl group, or a substituted or unsubstituted aralkyl group preferably having from 7 to 12 carbon atoms; and R$_4$ to R$_{10}$ each represents a hydrogen atom, an alkyl group having up to 4 carbon atoms, an alkoxyl group having up to 4 carbon atoms, a substituted or unsubstituted phenyl group, a substituted or unsubstituted aralkyl group, or a halogen atom. Examples of the substituents if any on the phenyl or aralkyl group for R$_3$ to R$_{10}$ include mono-, di- or trimethyl, ethyl and phenyl groups. In the above formulae, the plurality of each of R$_6$ and R$_{10}$ may be the same or different.

Of the group for X, particularly preferably are

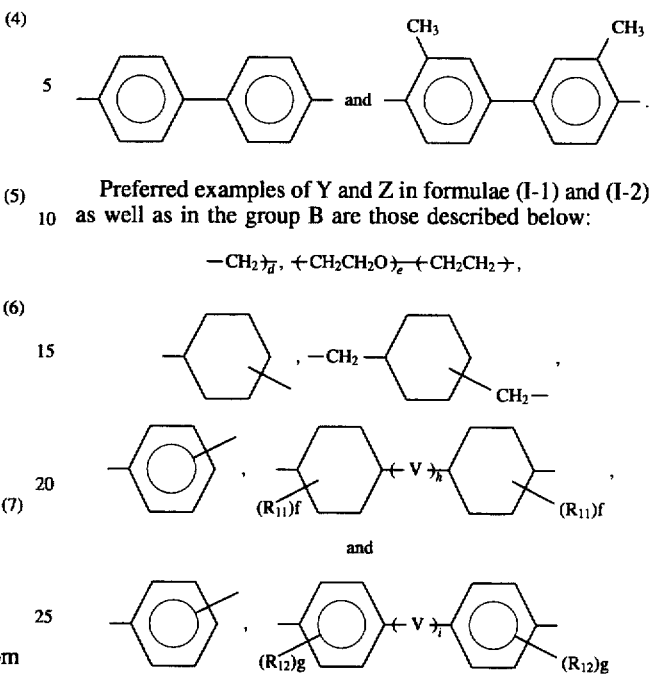

Preferred examples of Y and Z in formulae (I-1) and (I-2) as well as in the group B are those described below:

wherein R$_{11}$ and R$_{12}$ each represents a hydrogen atom, an alkyl group having up to 4 carbon atoms, an alkoxy group having up to 4 carbon atoms, a substituted or unsubstituted phenyl group, a substituted or unsubstituted aralkyl group or a halogen atom, V has the same meanings as defined above, d and e each represents an integer of 1 to 10, f and g each represents 0,1 or 2, and h and i each represents 0 or 1. In the above formulae, the plurality of each of R$_{11}$, R$_{12}$, f and g may be the same or different.

The above-described charge-transporting polymer of the present invention has a degree of polymerization, p, of from 5 to 5,000, preferably from 10 to 1,000. The weight-average molecular weight, M$_w$, thereof is preferably from 10,000 to 300,000. The molecular weight herein used is measured by GPC (calibrated with polystyrene).

Preferred examples of the charge-transporting polymer of the present invention are shown in Table 1 below, wherein the compounds having none (-) for Z are those of formula (I-1) and the remainders are those of formula (I-2) having the group of —O—(—Y—O—)$_m$—H or the group of —O—(—Y—O—)$_m$—CO—Z—COOR' for both the terminals B, or having these groups at the terminals, respectively. Each compound of formula (I-2) shown in Table 1 is a mixture of those having the three kinds of the terminals (i.e. those having the group of —O—(—Y—O—)$_m$—H at the terminals B, those having the group of —O—(—Y—O—)$_m$—CO—Z—COOR' at the terminals B and those having the group of —O—(—Y—O—)$_m$—H and the group of —O—(—Y—O—)$_m$—CO—Z—COOR' at the terminals B, respectively). Further, the column "BP" in Table 1 means bonding position of the methylene group on the phenyl group in formula (II).

TABLE 1
| Compound No. | X | Y | Z | $R_1$ | $R_2$ | BP | k | m | n | p |
|---|---|---|---|---|---|---|---|---|---|---|
| 1 | 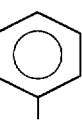 | $-CH_2CH_2-$ | — | 3-$CH_3$ | 4-$CH_3$ | 3 | 0 | 1 | 2 | 240 |
| 2 | 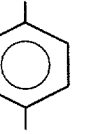 | $-CH_2CH_2-$ | — | H | H | 4 | 0 | 1 | 2 | 250 |
| 3 | 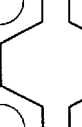 | $-CH_2CH_2-$ | — | H | H | 2 | 1 | 1 | 2 | 150 |
| 4 | 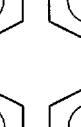 | $-CH_2CH_2-$ | — | H | H | 3 | 1 | 1 | 2 | 170 |
| 5 | 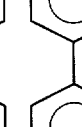 | $-CH_2CH_2-$ | — | H | H | 4 | 1 | 1 | 2 | 185 |
| 6 | 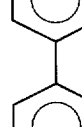 | $-CH_2CH_2-$ | — | H | H | 4 | 1 | 1 | 2 | 200 |
| 7 | 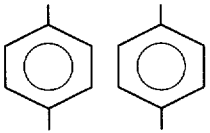 | $-CH_2CH_2-$ | — | H | H | 4 | 1 | 2 | 1 | 55 |
| 8 | 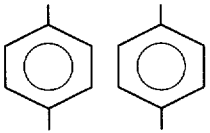 | $-CH_2CH_2-$ | 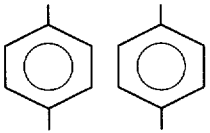 | H | H | 3 | 1 | 1 | 2 | 35 |
| 9 | 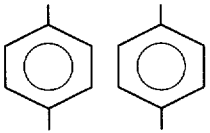 | $-CH_2CH_2-$ | 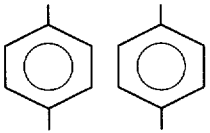 | H | H | 3 | 1 | 2 | 2 | 40 |

TABLE 1-continued

| Compound No. | X | Y | Z | $R_1$ | $R_2$ | BP | k | m | n | p |
|---|---|---|---|---|---|---|---|---|---|---|
| 10 | biphenyl | $-CH_2CH_2-$ | phenyl | H | H | 3 | 1 | 1 | 4 | 35 |
| 11 | biphenyl | $-CH_2CH_2-$ | phenyl (meta) | H | H | 3 | 1 | 1 | 2 | 20 |
| 12 | biphenyl | $\pm(CH_2)_\pi$ | biphenyl | H | H | 3 | 1 | 1 | 2 | 20 |
| 13 | biphenyl | $-CH_2CH_2-$ | biphenyl (ortho) | H | H | 3 | 1 | 1 | 2 | 15 |
| 14 | biphenyl | $\pm(CH_2)_\pi$ | $\pm(CH_2)_\pi$ | 4-$CH_3$ | H | 3 | 0 | 1 | 2 | 30 |
| 15 | biphenyl | cyclohexyl | — | H | H | 3 | 1 | 1 | 2 | 35 |
| 16 | biphenyl | cyclohexyl | phenyl | H | H | 3 | 1 | 1 | 2 | 20 |
| 17 | biphenyl | cyclohexyl | biphenyl | H | H | 3 | 1 | 1 | 2 | 20 |

TABLE 1-continued

| Compound No. | X | Y | Z | R₁ | R₂ | BP | k | m | n | p |
|---|---|---|---|---|---|---|---|---|---|---|
| 18 | biphenyl | cyclohexyl | -(CH₂)- | H | H | 3 | 1 | 1 | 2 | 15 |
| 19 | biphenyl | -CH₂-cyclohexyl-CH₂- | — | H | H | 3 | 1 | 1 | 2 | 30 |
| 20 | dimethylbiphenyl | -CH₂CH₂- | — | H | H | 3 | 1 | 1 | 2 | 180 |
| 21 | dimethylbiphenyl | -CH₂CH₂- | phenyl | H | H | 3 | 1 | 1 | 2 | 25 |
| 22 | dimethylbiphenyl | cyclohexyl | — | H | H | 3 | 1 | 1 | 2 | 30 |
| 23 | dimethylbiphenyl | cyclohexyl | — | H | H | 3 | 1 | 1 | 2 | 25 |

TABLE 1-continued

| Compound No. | X | Y | Z | R₁ | R₂ | BP | k | m | n | p |
|---|---|---|---|---|---|---|---|---|---|---|
| 24 | 3,3'-dimethylbiphenyl | 1,4-bis(methylene)cyclohexane | biphenyl | H | H | 3 | 1 | 1 | 2 | 25 |
| 25 | 3,3'-dimethylbiphenyl | –CH₂CH₂– | — | 2-CH₃ | H | 3 | 1 | 1 | 2 | 190 |
| 26 | 3,3'-dimethylbiphenyl | –CH₂CH₂– | phenyl | 3-CH₃ | H | 3 | 1 | 1 | 2 | 25 |
| 27 | 3,3'-dimethylbiphenyl | 1,3-dimethylcyclohexane | — | 4-CH₃ | H | 3 | 1 | 1 | 2 | 35 |
| 28 | 3,3'-dimethylbiphenyl | 1,2-dimethylcyclohexane | — | 3-CH₃ | 4-CH₃ | 3 | 1 | 1 | 2 | 30 |

TABLE 1-continued

| Compound No. | X | Y | Z | R₁ | R₂ | BP | k | m | n | p |
|---|---|---|---|---|---|---|---|---|---|---|
| 29 | 3,3'-dimethylbiphenyl | trans-1,4-bis(methylene)cyclohexane | 4,4'-biphenyl | 3-CH₃ | 5-CH₃ | 3 | 1 | 1 | 2 | 25 |
| 30 | pyrene | –CH₂CH₂– | — | H | H | 3 | 1 | 1 | 2 | 175 |
| 31 | pyrene | –CH₂CH₂– | phenyl | H | H | 3 | 1 | 1 | 2 | 40 |
| 32 | pyrene | 1,4-cyclohexyl | — | H | H | 3 | 1 | 1 | 2 | 35 |
| 33 | pyrene | 1,2-cyclohexyl | — | H | H | 3 | 1 | 1 | 2 | 30 |

TABLE 1-continued

| Compound No. | X | Y | Z | R₁ | R₂ | BP | k | m | n | p |
|---|---|---|---|---|---|---|---|---|---|---|
| 34 | pyrene | cyclohexane-1,4-diyl-bis(CH₂) | biphenyl | H | H | 3 | 1 | 1 | 2 | 20 |
| 35 | pyrene | —CH₂CH₂— | — | 2-CH₃ | H | 3 | 1 | 1 | 2 | 190 |
| 36 | pyrene | —CH₂CH₂— | phenyl | 3-CH₃ | H | 3 | 1 | 1 | 2 | 25 |
| 37 | pyrene | cyclohexane-1,4-diyl | — | 4-CH₃ | H | 3 | 1 | 1 | 2 | 30 |
| 38 | pyrene | cyclohexane-1,2-diyl | — | 3-CH₃ | 4-CH₃ | 3 | 1 | 1 | 2 | 30 |

TABLE 1-continued
| Compound No. | X | Y | Z | R₁ | R₂ | BP | k | m | n | p |
|---|---|---|---|---|---|---|---|---|---|---|
| 39 |  | 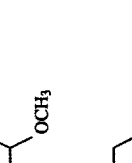 |  | 3-CH₃ | 5-CH₃ | 3 | 1 | 1 | 2 | 25 |
| 40 | 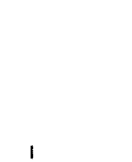 | —CH₂CH₂— | — | H | H | 3 | 1 | 1 | 2 | 175 |
| 41 | 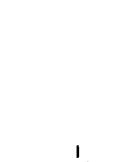 | —CH₂CH₂— |  | H | H | 3 | 1 | 1 | 2 | 35 |
| 42 | 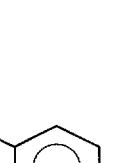 | 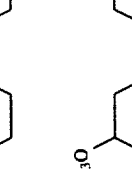 | — | H | H | 3 | 1 | 1 | 2 | 35 |
| 43 | 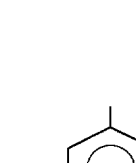 |  | — | H | H | 3 | 1 | 1 | 2 | 30 |

TABLE 1-continued

| Compound No. | X | Y | Z | $R_1$ | $R_2$ | BP | k | m | n | p |
|---|---|---|---|---|---|---|---|---|---|---|
| 44 | (dimethoxy-dimethyl-biphenyl) | (cyclohexane-1,4-diyl-bis-CH$_2$) | (biphenyl) | H | 4-CH$_3$ | 3 | 1 | 1 | 2 | 25 |
| 45 | (dimethyl-dimethylfluorene) | —CH$_2$CH$_2$— | — | H | H | 3 | 1 | 1 | 2 | 180 |
| 46 | (dimethyl-dimethylfluorene) | —CH$_2$CH$_2$— | (phenylene) | H | H | 3 | 1 | 1 | 2 | 30 |
| 47 | (dimethyl-dimethylfluorene) | (cyclohexane-1,4-diyl) | — | H | H | 3 | 1 | 1 | 2 | 35 |
| 48 | (dimethyl-dimethylfluorene) | (cyclohexane-1,2-diyl) | — | H | H | 3 | 1 | 1 | 2 | 30 |
| 49 | (dimethyl-dimethylfluorene) | (cyclohexane-1,4-diyl-bis-CH$_2$) | (biphenyl) | H | H | 3 | 1 | 1 | 2 | 25 |
| 50 | (dimethyl-dimethylfluorene) | —CH$_2$CH$_2$— | — | 2-CH$_3$ | H | 3 | 1 | 1 | 2 | 180 |

TABLE 1-continued

| Compound No. | X | Y | Z | $R_1$ | $R_2$ | BP | k | m | n | p |
|---|---|---|---|---|---|---|---|---|---|---|
| 51 | (dimethyl fluorene-type) | $-CH_2CH_2-$ | phenyl | 3-$CH_3$ | H | 3 | 1 | 1 | 2 | 40 |
| 52 | (dimethyl fluorene-type) | cyclohexyl | — | 4-$CH_3$ | H | 3 | 1 | 1 | 2 | 40 |
| 53 | (dimethyl fluorene-type) | cyclohexyl | — | 3-$CH_3$ | 4-$CH_3$ | 3 | 1 | 1 | 2 | 35 |
| 54 | (dimethyl fluorene-type) | $-CH_2-$cyclohexyl-$CH_2-$ | biphenyl | 3-$CH_3$ | 5-$CH_3$ | 3 | 1 | 1 | 2 | 35 |
| 55 | (dimethyl fluorene-type) | bisphenol-A-type | — | 3-$CH_3$ | 5-$CH_3$ | 3 | 1 | 1 | 2 | 25 |
| 56 | (dimethyl fluorene-type) | bisphenol-A-type | bisphenol-A-type | 3-$CH_3$ | 5-$CH_3$ | 3 | 1 | 1 | 2 | 25 |
| 57 | tetramethylbiphenyl | $-CH_2CH_2-$ | — | H | 4-$CH_3$ | 4 | 1 | 1 | 2 | 160 |

TABLE 1-continued

| Compound No. | X | Y | Z | $R_1$ | $R_2$ | BP | k | m | n | p |
|---|---|---|---|---|---|---|---|---|---|---|
| 58 | 3,3'-dimethylbiphenyl-4-yl | $-CH_2CH_2-$ | — | 3-$CH_3$ | 4-$CH_3$ | 4 | 1 | 1 | 2 | 165 |
| 59 | 3,3'-dimethylbiphenyl-4-yl | $-CH_2CH_2CH_2-$ | — | 3-$CH_3$ | 4-$CH_3$ | 4 | 1 | 1 | 2 | 160 |
| 60 | 3,3'-dimethylbiphenyl-4-yl | $-CH_2CH_2-$ | — | 3-$CH_3$ | 4-$CH_3$ | 4 | 1 | 2 | 2 | 145 |
| 61 | 3,3'-dimethylbiphenyl-4-yl | $-CH_2CH_2-$ | — | H | 4-$CH_3$ | 4 | 1 | 1 | 3 | 165 |
| 62 | 3,3'-dimethylbiphenyl-4-yl | $-CH_2CH_2-$ | — | 3-$CH_3$ | 4-$CH_3$ | 4 | 1 | 1 | 3 | 170 |

TABLE 1-continued

| Compound No. | X | Y | Z | $R_1$ | $R_2$ | BP | k | m | n | p |
|---|---|---|---|---|---|---|---|---|---|---|
| 63 | 3,3'-dimethylbiphenyl | $-CH_2CH_2-$ | — | H | 4-OCH$_3$ | 4 | 1 | 1 | 2 | 150 |
| 64 | 3,3'-dimethylbiphenyl | $-CH_2CH_2CH_2-$ | — | H | 4-OCH$_3$ | 4 | 1 | 1 | 2 | 145 |
| 65 | 3,3'-dimethylbiphenyl | $-CH_2CH_2-$ | — | H | H | 4 | 1 | 1 | 1 | 175 |
| 66 | 3,3'-dimethylbiphenyl | $-CH_2CH_2-$ | — | H | 4-CH$_3$ | 4 | 1 | 1 | 1 | 40 |
| 67 | 3,3'-dimethylbiphenyl | $-CH_2CH_2-$ | — | 3-CH$_3$ | 4-CH$_3$ | 4 | 1 | 1 | 1 | 150 |

TABLE 1-continued

| Compound No. | X | Y | Z | $R_1$ | $R_2$ | BP | k | m | n | p |
|---|---|---|---|---|---|---|---|---|---|---|
| 68 | 3,3'-dimethylbiphenyl | $-CH(CH_3)CH_2-$ | — | $3-CH_3$ | $4-CH_3$ | 4 | 1 | 1 | 2 | 170 |
| 69 | 3,3'-dimethylbiphenyl | $-CH_2CH_2CH_2-$ | — | $3-CH_3$ | $4-CH_3$ | 4 | 1 | 1 | 2 | 190 |
| 70 | 3,3'-dimethylbiphenyl | $-CH_2C(CH_3)_2CH_2-$ | — | $3-CH_3$ | $4-CH_3$ | 4 | 1 | 1 | 2 | 195 |
| 71 | terphenyl | $-CH_2CH_2-$ | — | H | H | 4 | 1 | 1 | 2 | 165 |
| 72 | terphenyl | $-CH_2CH_2-$ | — | H | $4-CH_3$ | 4 | 1 | 1 | 2 | 160 |
| 73 | terphenyl | $-CH_2CH_2-$ | — | $3-CH_3$ | $4-CH_3$ | 4 | 1 | 1 | 2 | 155 |

A monomer for use in producing the above-described charge-transporting polymer of the present invention can be easily synthesized by reacting an arylamine, a diarylbenzidine, or the like with a halogenated alkoxycarbonylalkylbenzene.

A process for synthesizing a charge transport material having an alkylenecarboxylic acid ester group is described in JP-A-5-80550, which process comprises introducing a chloromethyl group into a starting compound, subsequently reacting Mg to form a Grignard reagent, converting the Grignard reagent to a carboxylic acid with carbon dioxide, and then esterifying the carboxylic acid. In this process, however, the incorporation of a chloromethyl group into a starting compound is impossible in the initial stage of the process because of the high reactivity of the group. It is therefore necessary to use a method in which a chloromethyl group is incorporated after the skeleton of a triarylamine, a tetraarylbenzidine, or the like has been formed. This incorporation of a chloromethyl group may be accomplished, for example, by incorporating a methyl group into a starting compound at an initial stage and converting the methyl group into a chloromethyl group at that later stage, or by using an unsubstituted starting compound and conducting direct chloromethylation at that later stage, or by first incorporating a formyl group and converting the formyl group to a hydroxymethyl group through reduction and then to a chloromethyl group with, e.g., thionyl chloride. However, the conversion to a chloromethyl group of the methyl group incorporated beforehand is virtually impossible because the charge transport material having the skeleton of a triarylamine, a tetraarylbenzidine, or the like has exceedingly high reactivity and is hence apt to undergo displacement to an aromatic ring. The method in which an unsubstituted starting compound is used and direct chloromethylation is conducted later is disadvantageous in that the position of the incorporated chloromethyl group is limited to para to the nitrogen atom. Further, the method comprising incorporating a formyl group and thereafter converting it into a chloromethyl group has a drawback of the necessity of prolonged steps. In contrast, the process in which an arylamine, a diarylbenzidine, or the like is reacted with a halogenated alkoxycarbonylalkylbenzene to obtain a monomer is superior in that ionization potential control is easily attained by changing the positions of the substituents; this process enables the control of the ionization potential of the charge-transporting polymer. Various substituents can be easily incorporated into the charge-transporting monomer for use in the present invention. This monomer is chemically stable and is hence easily handleable. Hence, the problems described hereinabove can be eliminated.

The charge-transporting polymer of the present invention described above can be synthesized by polymerizing a charge-transporting monomer represented by the following structural formula (III-1) by, e.g., the known method described in *Lectures on Experimental Chemistry*, 4th edition, Vol. 28.

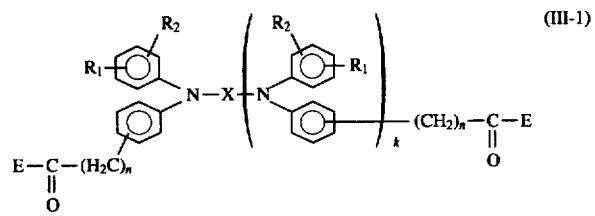

In formula (III-1), $R_1$, $R_2$, X, n and k have the same meanings as defined above, and E represents a hydroxyl group, a halogen atom, or a group represented by —O—$R_{13}$ (where $R_{13}$ represents an alkyl group, preferably having up to 10 carbon atoms a substituted or unsubstituted aryl group, or an aralkyl group preferably having from 7 to 12 carbon atoms). The substituent if any on the aryl group for $R_{13}$ may be methyl, ethyl, propyl, phenyl, and benzyl groups.

Illustratively stated, the charge-transporting polymer represented by formula (I-1) can be synthesized as follows.

In the case where E in formula (III-1) is a hydroxyl group, the charge-transporting monomer is mixed with an almost equivalent amount of a dihydric alcohol represented by HO—(Y—O)$_m$—H, and polymerized using an acid catalyst. The acid catalyst may be one for use in ordinary esterification reactions, such as sulfuric acid, toluenesulfonic acid, or trifluoroacetic acid. This catalyst is used in an amount of from $10^{-4}$ to $10^{-1}$ part by weight, preferably from $10^{-3}$ to 0.02 part by weight, per part by weight of the charge-transporting monomer. For removing water generated during the reaction, it is preferred to use a solvent capable of forming an azeotrope with water. Solvents effective for this purpose include toluene, chlorobenzene, and 1-chloronaphthalene. Such a solvent may be used in an amount of from 1 to 100 parts by weight, preferably from 2 to 50 parts by weight, per part by weight of the charge-transporting monomer. Any desired reaction temperature may be used, but the reaction is preferably conducted at the boiling point of the solvent for the purpose of removing the water generated during the polymerization.

In the case where the reaction is carried out without a solvent, the reaction mixture obtained after completion of the reaction is dissolved into a solvent in which the reaction product is soluble, such as dichloromethane, trichloromethane, monochlorobenzene, toluene, xylene, and benzene. The resulting solution is dropwise added into a solvent having poor solubility (poor solvent) for the charge-transporting polymer, such as an alcohol (e.g., methanol or ethanol), or acetone. In the case where the reaction is carried out using a solvent, the resulting reaction mixture in the form of solution is dropwise added as it is into such a poor solvent. Thus, the charge-transporting polymer is precipitated. The precipitated charge-transporting polymer is separated, subsequently sufficiently washed with water or an organic solvent, and then dried. If desired, this polymer may be subjected to a reprecipitation treatment in which the polymer is dissolved into an appropriate organic solvent and the solution is dropwise added into a poor solvent to precipitate the charge-transporting polymer. This reprecipitation treatment is preferably conducted with efficient stirring using a mechanical stirrer, etc. In the reprecipitation treatment, the solvent for dissolving the charge-transporting polymer is used in an amount of from 1 to 100 parts by weight, preferably from 2 to 50 parts by weight, per part by weight of the charge-transporting polymer. The poor solvent is used in an amount of from 1 to 1,000 parts by weight, preferably from 10 to 500 parts by weight, per part by weight of the charge-transporting polymer.

In the case where E in formula (III-1) is a halogen, the charge-transporting monomer is mixed with an almost equivalent amount of a dihydric alcohol represented by HO—(Y—O)$_m$—H, and polymerized using an organic basic catalyst, e.g., pyridine or triethylamine. The organic basic catalyst is used in an amount of from 1 to 10 equivalents, preferably from 2 to 5 equivalents, to the charge-transporting monomer. Effective solvents include methylene chloride, tetrahydrofuran (THF), toluene, chlorobenzene, and 1-chloronaphthalene. Such a solvent may be used in an amount of from 1 to 100 parts by weight, preferably from 2 to 50 parts by weight, per part by weight of the charge-transporting monomer. Any desired reaction temperature may be used. After polymerization, a reprecipitation treatment is performed in the same manner as described above to purify the polymer.

In the case of using a dihydric alcohol having a high acidity, such as a bisphenol, the interfacial polymerization method is also usable. This interfacial polymerization may be accomplished by adding the dihydric alcohol to water, adding an equivalent or more amount of a base to dissolve the dihydric alcohol, and then adding with vigorous agitation a solution of the charge-transporting monomer in an amount equivalent to the dihydric alcohol. In this polymerization, the water is used in an amount of from 1 to 1,000 parts by weight, preferably from 2 to 500 parts by weight, per part by weight of the dihydric alcohol. Solvents effective in dissolving the charge-transporting monomer therein include methylene chloride, dichloroethane, trichloroethane, toluene, chlorobenzene, and 1-chloronaphthalene. Any desired reaction temperature may be used. Use of a phase-transfer catalyst, e.g., an ammonium salt or a sulfonium salt, is effective in accelerating the reaction. Such a phase-transfer catalyst may be used in an amount of from 0.1 to 10 parts by weight, preferably from 0.2 to 5 parts by weight, per part by weight of the charge-transporting monomer.

In the case where E in formula (III-1) is —O—$R_{13}$, the desired polymer can be synthesized by adding an excess of a dihydric alcohol represented by HO—(Y—O)$_m$—H to the charge-transporting monomer and heating the mixture in the presence of a catalyst selected from an inorganic acid (e.g., sulfuric acid or phosphoric acid), a titanium alkoxide, a salt of calcium, cobalt, etc. with acetic acid or carbonic acid, and an oxide of zinc or lead to cause transesterification. The dihydric alcohol is used in an amount of from 2 to 100 equivalents, preferably from 3 to 50 equivalents, to the charge-transporting monomer. The catalyst is used in an amount of from $10^{-4}$ to 1 part by weight, preferably from $10^{-3}$ to 0.5 part by weight, per part by weight of the charge-transporting monomer. The reaction is carried out at a temperature of from 200° to 300° C. After completion of the transesterification in which the group —O—$R_{13}$ is converted to —O—(Y—O)$_m$—H, the subsequent reaction is preferably conducted at a reduced pressure generally from 0.01 to 100 mmHg, preferably from 0.05 to 20 mmHg, in order to accelerate the polymerization which proceeds with the elimination of HO—(Y—O)$_m$—H. In this reaction, a high-boiling solvent capable of forming an azeotrope with the HO—(Y—O)$_m$—H, such as 1-chloronaphthalene, may be used to conduct the reaction while removing the HO—(Y—O)$_m$—H as an azeotrope at ordinary pressure.

The charge-transporting polymer represented by formula (I-2) can be synthesized as follows.

In each of the aforementioned cases, an excess of the dihydric alcohol is added to the compound represented by structural formula (III-1), and reacted to yield a compound represented by formula (III-2).

In formula (III-2), $R_1$, $R_2$ X, Y, n, m, and k have the same meanings as defined above.

The compound of formula (III-2) is then reacted as a charge-transporting monomer with an almost equivalent amount of a dibasic carboxylic acid, a halide thereof, or the like using an organic basic catalyst, e.g., pyridine or triethylamine, to thereby obtain the charge-transporting polymer of formula (I-2). The organic basic catalyst is used in an amount of from 1 to 10 equivalents, preferably from 2 to 5 equivalents, to the charge-transporting monomer. Effective solvents include methylene chloride, tetrahydrofuran (THF), toluene, chlorobenzene, and 1-chloronaphthalene. Such a solvent may be used in an amount of from 1 to 100 parts by weight, preferably from 2 to 50 parts by weight, per part by weight of the charge-transporting monomer. Any desired reaction temperature may be used. After polymerization, a reprecipitation treatment is performed in the same manner as described above to purify the polymer.

The novel charge-transporting polymer of the present invention is used in an organic electronic device such as an organic electroluminescent element, an electroconductive polymer doped with iodine, benzoquinone, chloranil as an acceptor, and an electrophotographic photoreceptor. The organic electronic device of the present invention preferably contains the charge-transporting polymer and an insulating polymer compatible therewith.

Specifically, the organic electronic device may have a structure comprising a support having formed thereon a layer containing the charge-transporting polymer. Representative organic electronic device of the present invention include an electrophotographic photoreceptor having a photosensitive layer, in particular an electrophotographic photoreceptor having a surface layer in which the charge-transporting polymer of formula (I-1) or (I-2) is contained with or without other resins or charge-transport materials, or in which an charge generation material is dispersed in the charge-transporting polymer. For example, the charge-transporting polymer of the present invention may be provided as an overcoat layer on a photosensitive layer of conventional electrophotographic photoreceptor. In the case, the overcoat layer generally has a thickness of from 1 to 20 μm and preferably from 3 to 10 μm. A preferred electrophotographic photoreceptor is one having a photosensitive layer containing the charge-transporting polymer represented by formula (I-1) or (I-2) as a charge transport material and phthalocyanine compound crystals as a charge generation material.

Examples of the phthalocyanine crystals used in combination with the charge-transporting polymer in the above-described electrophotographic photoreceptor of the present invention include the halogenated gallium phthalocyanine crystals disclosed in JP-A-5-98181, the halogenated tin phthalocyanine crystals disclosed in JP-A-5-140472 and JP-A-5-140473, the hydroxygallium phthalocyanine crystals disclosed in JP-A-5-263007 and JP-A-5-279591, and the

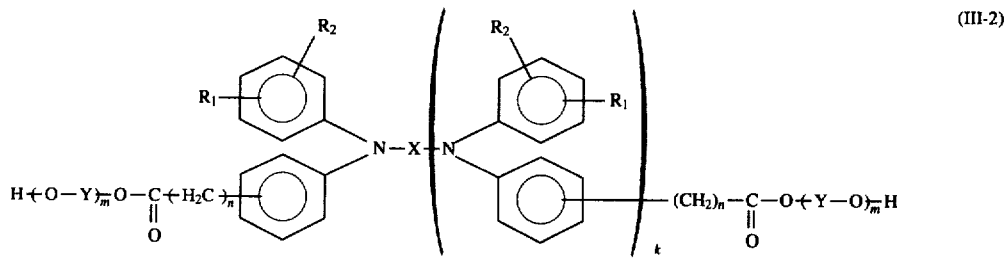

oxytitanium phthalocyanine hydrate crystals disclosed in JP-A-4-189873 and JP-A-5-43813. By use of such phthalocyanine crystals, an electrophotographic photoreceptor having especially high sensitivity and excellent stability to repeated use can be obtained.

Chlorogallium phthalocyanine crystals for use in the present invention can be produced, as disclosed in JP-A-5-98181, from chlorogallium phthalocyanine crystals produced by a known method, either by mechanically dry-grinding the crystals with an automatic mortar, a planetary mill, an oscillating mill, a CF mill, a roll mill, a sand mill, a kneader, or the like or by subjecting the crystals to such dry grinding and then to wet grinding along with a solvent using a ball mill, a mortar, a sand mill, a kneader, or the like. Examples of the solvent used in the above treatment include aromatic compounds (e.g., toluene and chlorobenzene), amides (e.g., dimethylformamide and N-methylpyrrolidone), aliphatic alcohols (e.g., methanol, ethanol, and butanol), aliphatic polyhydric alcohols (e.g., ethylene glycol, glycerol, and poly(ethylene glycol)), aromatic alcohols (e.g., benzyl alcohol and phenethyl alcohol), esters (e.g., ethyl acetate and butyl acetate), ketones (e.g., acetone and methyl ethyl ketone), dimethyl sulfoxide, ethers (e.g., diethyl ether and tetrahydrofuran), mixtures of two or more thereof, and mixtures of water and one or more of these organic solvents. The solvent is used in an amount of from 1 to 200 parts, preferably from 10 to 100 parts, per the chlorogallium phthalocyanine. The treatment is performed at a temperature of from 0° C. to the boiling point of the solvent, preferably from 10° to 60° C. A grinding aid, e.g., common salt or Glauber's salt, may be used in the grinding in an amount from 0.5 to 20 times, preferably from 1 to 10 times, the amount of the pigment.

Dichlorotin phthalocyanine crystals for use in the present invention can be obtained, as disclosed in JP-A-5-140472 and JP-A-5-140473, from dichlorotin phthalocyanine crystals produced by a known method, by grinding the crystals in the same manner as for the above-described chlorogallium phthalocyanine and treating the ground crystals with a solvent.

The hydroxygallium phthalocyanine crystals can be produced by the methods disclosed in JP-A-5-263007 and JP-A-5-279591. That is, chlorogallium phthalocyanine crystals produced by a known method are subjected to hydrolysis in an acidic or alkaline solution or to acid pasting to synthesize hydroxygallium phthalocyanine crystals, which are then directly treated with a solvent or subjected to wet grinding along with a solvent using a ball mill, a mortar, a sand mill, a kneader, etc., or which are dry-ground without using a solvent and then treated with a solvent, thereby giving the desired crystals. Examples of the solvents used in the above treatments include aromatic compounds (e.g., toluene and chlorobenzene), amides (e.g., dimethylformamide and N-methylpyrrolidone), aliphatic alcohols (e.g., methanol, ethanol, and butanol), aliphatic polyhydric alcohols (e.g., ethylene glycol, glycerol, and poly(ethylene glycol)), aromatic alcohols (e.g., benzyl alcohol and phenethyl alcohol), esters (e.g., ethyl acetate and butyl acetate), ketones (e.g., acetone and methyl ethyl ketone), dimethyl sulfoxide, ethers (e.g., diethyl ether and tetrahydrofuran), mixtures of two or more thereof, and mixtures of water and one or more of these organic solvents. The solvent is used in an amount of from 1 to 200 parts, preferably from 10 to 100 parts, per the hydroxygallium phthalocyanine. The treatments are performed at a temperature of from 0° to 150° C., preferably from room temperature to 100° C. A grinding aid, e.g., common salt or Glauber's salt, may be used in the grinding in an amount from 0.5 to 20 times, preferably from 1 to 10 times, the amount of the pigment.

The oxytitanium phthalocyanine crystals can be produced by the methods disclosed in JP-A-4-189873 and JP-A-5-43813. That is, oxytitanium phthalocyanine produced by a known method is subjected to acid pasting or to salt milling along with an inorganic salt using a ball mill, a mortar, a sand mill, a kneader, or the like to obtain oxytitanium phthalocyanine crystals which have relatively low crystallinity and give an X-ray diffraction spectrum having a peak at 27.2°. The crystals obtained are directly treated with a solvent or subjected to wet grinding along with a solvent using a ball mill, a mortar, a sand mill, a kneader, or the like, thereby giving the desired crystals. For the acid pasting, sulfuric acid is preferably used, which has a concentration of from 70 to 100%, preferably from 95 to 100%. The temperature for dissolution is from −20° to 100° C., preferably from 0° to 60° C. The amount of concentrated sulfuric acid is from 1 to 100 times, preferably from 3 to 50 times, the amount of the oxytitanium phthalocyanine crystals. The solvent for precipitation is water or a mixed solvent composed of water and an organic solvent, and may be used in any desired amount. Especially preferred precipitation solvents are a mixed solvent composed of water and an alcohol such as methanol or ethanol and a mixed solvent composed of water and an aromatic solvent such as benzene or toluene. The temperature for precipitation is not particularly limited, but it is preferred to conduct cooling with ice or by other means in order to prevent heat generation. The proportion of the oxytitanium phthalocyanine crystals to the inorganic salt is from 1/0.1 to 1/20 by weight, preferably from 1/0.5 to 1/5 by weight. Examples of the solvent used in the above solvent treatment include aromatic compounds (e.g., toluene and chlorobenzene), aliphatic alcohols (e.g., methanol, ethanol, and butanol), halogenated hydrocarbons (e.g., dichloromethane, chloroform, and trichloroethane), mixtures of two or more thereof, and mixed solvents composed of water and one or more of these organic solvents. The solvent is used in an amount of from 1 to 100 times, preferably from 5 to 50 times, the amount of the oxytitanium phthalocyanine. The temperature for the treatment is from room temperature to 100° C., preferably from 50° to 100° C. A grinding aid may be used in an amount from 0.5 to 20 times, preferably from 1 to 10 times, the amount of the pigment.

In the electrophotographic photoreceptor, these phthalocyanine compound crystals are incorporated as a charge generation material preferably in a charge generation layer in the photosensitive layer.

The electrophotographic photoreceptor is then explained below.

A preferred electrophotographic photoreceptor of the present invention comprises a conductive support having provided thereon a photosensitive layer containing the charge-transporting polymer of formula (I-1) or (I-2), which may have either a single layer structure, or a laminated structure in which a charge generation layer and a charge transport layer are functionally separated from each other. In the case of laminated structure, the order of lamination of the charge generation layer and the charge transport layer may be arbitrary. If desired, an overcoat layer may be provided on the photosensitive layer as described above.

When the photosensitive layer has a single layer structure, the thickness of the layer is generally from 5 to 50 μm and preferably from 10 to 35 μm. When the photosensitive layer has a laminated structure, the charge generation layer generally has a thickness of from 0.2 to 5 μm, preferably from 0.5 to 2 μm, and the charge transport layer generally has a thickness of from 5 to 50 μm, preferably 10 to 35 μm.

Examples of conductive supports include metals such as aluminum, nickel, chromium, and stainless steel, plastic or other films having a thin film of, e.g., aluminum, titanium, nickel, chromium, stainless steel, gold, vanadium, tin oxide, indium oxide, or ITO, and paper, plastic, or other supports coated or impregnated with a conducting agent. These conductive supports may be used in a suitable form such as a drum, sheet, or plate form, but the supports are not limited to these forms. If desired or necessary, the surface of the conductive support may be subjected to various treatments as long as these treatments do not adversely influence image quality. Examples of such surface treatments include oxidation treatment, treatment with a chemical, coloring treatment, and treatments for inhibiting irregular reflection, such as graining. An undercoat layer may be formed between the conductive support and the charge generation layer. This undercoat layer functions not only to inhibit injection from the conductive support into the photosensitive layer having a laminated structure at the time when the photosensitive layer is in an electrified state, but also as an adhesive layer for tenaciously bonding the photosensitive layer to the conductive support. In some cases, the undercoat layer also functions to inhibit light reflection by the conductive support.

A binder resin for use in forming the undercoat layer may be a known material. Examples thereof include polyethylene resins, polypropylene resins, acrylic resins, methacrylic resins, polyamide resins, vinyl chloride resins, vinyl acetate resins, phenolic resins, polycarbonate resins, polyurethane resins, polyimide resins, vinylidene chloride resins, poly(vinyl acetal) resins, vinyl chloride-vinyl acetate copolymers, poly(vinyl alcohol) resins, water-soluble polyester resins, nitrocellulose, casein, gelatin, poly(glutamic acid), starch, starch acetate, aminostarch, poly(acrylic acid), polyacrylamide, zirconium chelate compounds, titanyl chelate compounds, titanyl alkoxide compounds, organic titanyl compounds, and silane coupling agents. The thickness of the undercoat layer is from 0.01 to 10 μm, preferably from 0.05 to 2 μm. Coating methods usable for forming the undercoat layer include ordinary coating techniques such as blade coating, Mayer bar coating, spray coating, dip coating, bead coating, air knife coating, and curtain coating.

The charge transport layer may consist of the charge-transporting polymer of the invention alone, or may be composed of a combination of the charge-transporting polymer with a known binder resin, a charge transport material of another type such as, e.g., the hydrazone, triarylamine, or stilbene type, etc. Examples of the binder resin include known resins such as polycarbonate resins, polyester resins, methacrylic resins, acrylic resins, poly(vinyl chloride) resins, poly(vinylidene chloride) resins, polystyrene resins, poly(vinyl acetate) resins, styrene-butadiene copolymers, vinylidene chloride-acrylonitrile copolymers, vinyl chloride-vinyl acetate copolymers, vinyl chloride-vinyl acetate-maleic anhydride copolymers, silicone resins, silicone-alkyd resins, phenol-formaldehyde resins, styrene-alkyd resins, poly(N-vinylcarbazole), and polysilanes. However, usable binder resins are not limited thereto. Of these binder resins, the polycarbonate resins represented by the following structural formulae (IV) to (IX) or polycarbonate resins obtained by copolymerizing these resins are preferred in that such resins show good compatibility and give a homogeneous film having especially good properties. The proportion (by weight) of the charge-transporting polymer to the binder resin is preferably from 10:0 to 8:10. In the case of mixing the charge-transporting polymer with another charge transport material, the proportion of the sum of the charge-transporting polymer and the binder resin to another charge transport material is preferably from 10:0 to 10:8.

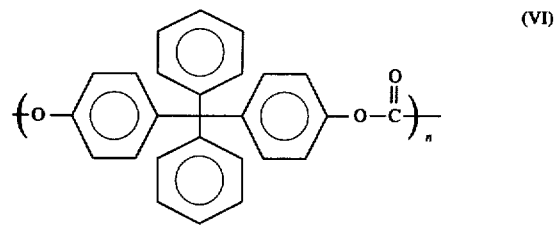

(VI)

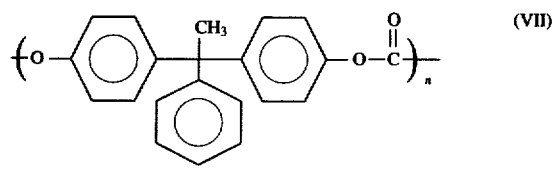

(VII)

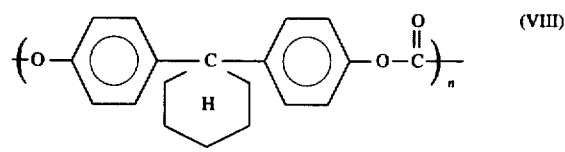

(VIII)

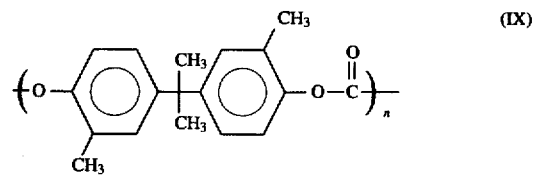

(IX)

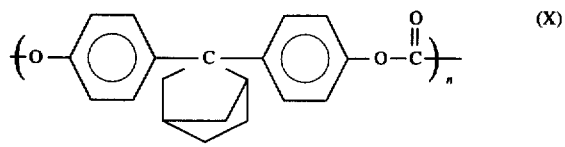

(X)

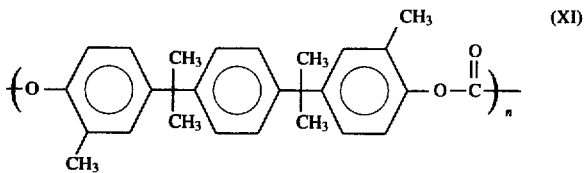

(XI)

In the above formulae (IV) to (IX), n indicating a degree of polymerization is from 50 to 3,000.

Although the charge generation material contained in the charge generation layer is preferably the phthalocyanine crystals described above, any other known charge generation material may also be used, such as bisazo pigments, squarilium pigments, perylene pigments and dibromoanthanthrone, as well as other phthalocyanine pigments.

The binder resin for use in the charge generation layer can be selected from a wide variety of insulating resins. It is also possible to select the binder resin from organic photoconductive polymers such as poly(N-vinylcarbazole), poly(vinylanthracene), poly(vinylpyrene), and polysilanes. Preferred binder resins include insulating resins such as poly(vinyl butyral) resins, polyarylate resins (e.g., polycondensation products obtained from bisphenol A and phthalic acid), polycarbonate resins, polyester resins, phenoxy resins, vinyl chloride-vinyl acetate copolymers, polyamide resins, acrylic resins, polyacrylamide resins, poly(vinylpyridine) resins, cellulose resins, urethane resins, epoxy resins, casein, poly(vinyl alcohol) resins, and poly(vinylpyrrolidone) resins. However, the binder resin for the charge generation layer is not limited thereto. These binder resins may be used alone or as a mixture of two or more thereof.

The proportion (by weight) of the charge generation material to the binder resin is preferably from 10:1 to 1:10. For dispersing these ingredients, an ordinary technique may be employed using, e.g., a ball mill, an attritor, or a sand mill.

It is effective in this dispersion treatment to reduce the particle size of charge generation material to 0.5 μm or smaller, preferably 0.3 μm or smaller, more preferably 0.15 μm or smaller. For dispersing those ingredients, ordinary organic solvents may be used either alone or as a mixture of two or more thereof. Examples thereof include methanol, ethanol, n-propanol, n-butanol, benzyl alcohol, methyl Cellosolve, ethyl Cellosolve, acetone, methyl ethyl ketone, cyclohexanone, methyl acetate, n-butyl acetate, dioxane, tetrahydrofuran, methylene chloride, chloroform, chlorobenzene, and toluene.

The present invention will be explained below by reference to the following Examples. In the Examples, all "parts" are by weight.

SYNTHESIS EXAMPLE 1

(Synthesis of N,N'-Diphenyl-N,N'-bis[3-(2-ethoxycarbonylethyl)phenyl]-[1,1'-biphenyl]-4,4'-diamine Into a 100-ml flask were introduced 10.77 g of N,N'-diphenylbenzidine, 23.0 g of ethyl 3-iododihydrocinnamate, 11.61 g of potassium carbonate, 1.0 g of copper sulfate pentahydrate, and 20 ml of n-tridecane. The reactants were reacted with heating at 230° C. for 1 hour under an atmosphere of nitrogen. After the reaction, the reaction mixture was cooled to room temperature and then dissolved into 50 ml of toluene. Insolubles were filtered off, and the filtrate was purified by silica gel column chromatography using toluene. As a result, 19.6 g of N,N'-diphenyl-N,N'-bis[3-(2-ethoxycarbonylethyl)phenyl]-[1,1'-biphenyl]-4,4'-diamine was obtained as an oily substance. An IR spectrum of this compound is shown in FIG. 1.

SYNTHESIS EXAMPLE 2

(Synthesis of N,N-Bis[3-(2-ethoxycarbonylethyl)phenyl]-3,4-xylidine)

Figure 2:
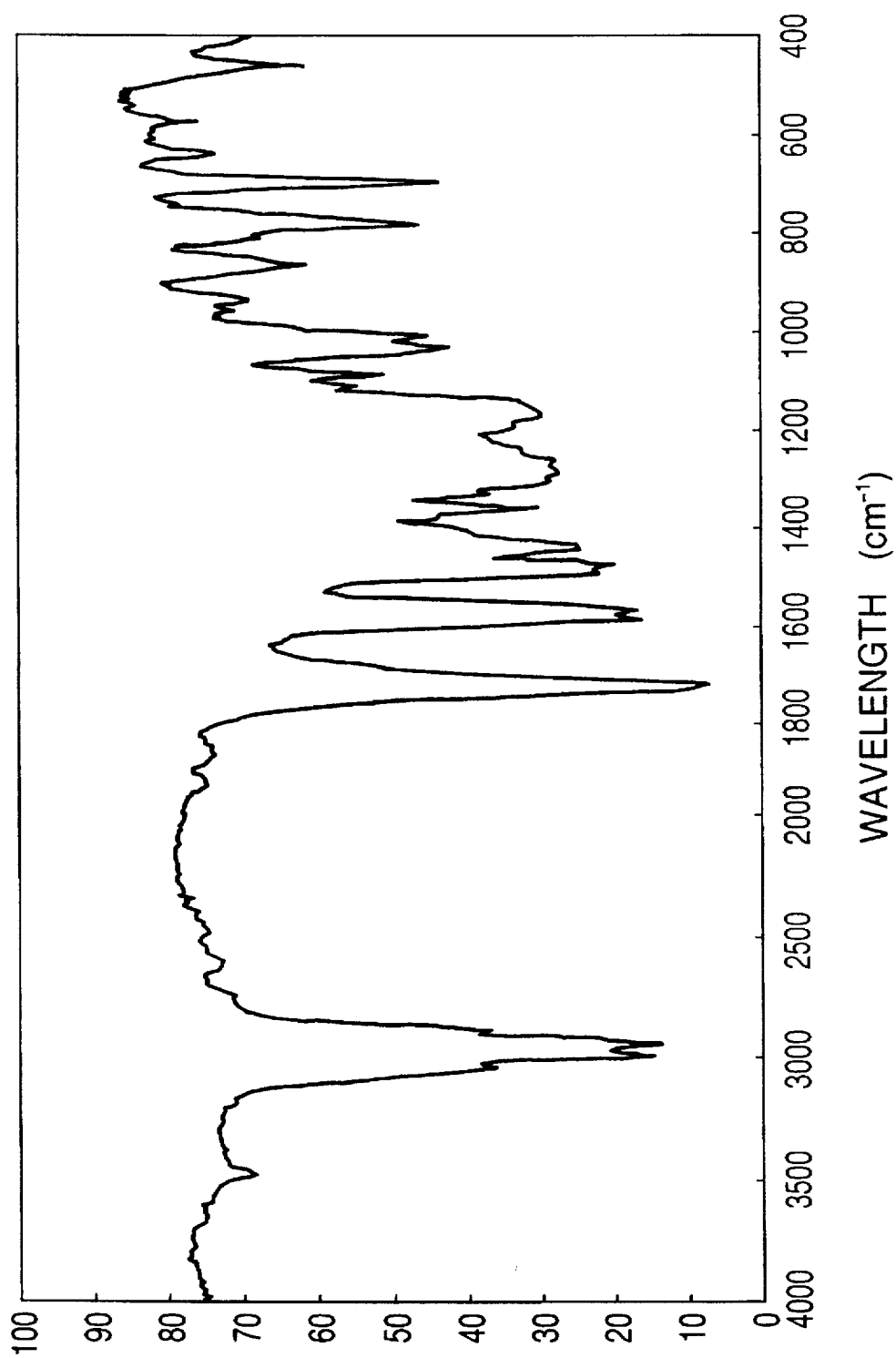
FIG. 2 is an IR spectrum of N,N-bis[3-(2-ethoxycarbonylethyl)phenyl]-3,4-xylidine.

Into a 100-ml flask were introduced 0.6 g of 3,4-xylidine, 3.4 g of ethyl 3-iododihydrocinnamate, 1.9 g of potassium carbonate, 0.5 g of copper sulfate pentahydrate, and 5 ml of n-tridecane. The reactants were reacted with heating at 230° C. for 10 hours under an atmosphere of nitrogen. After the reaction, the reaction mixture was cooled to room temperature and then dissolved into 50 ml of toluene. Insolubles were filtered off, and the filtrate was purified by silica gel column chromatography using toluene. As a result, 2.0 g of N,N-bis[3-(2-ethoxycarbonylethyl)phenyl]-3,4-xylidine was obtained as an oily substance. An IR spectrum of this compound is shown in FIG. 2.

SYNTHESIS EXAMPLE 3

(Synthesis of 3,3'-Dimethyl-N,N'-bis(3,4-dimethylphenyl)-N,N'-bis[4-(2-methoxycarbonylethyl)phenyl]-[1,1'-biphenyl]-4,4'-diamine)

Figure 3:
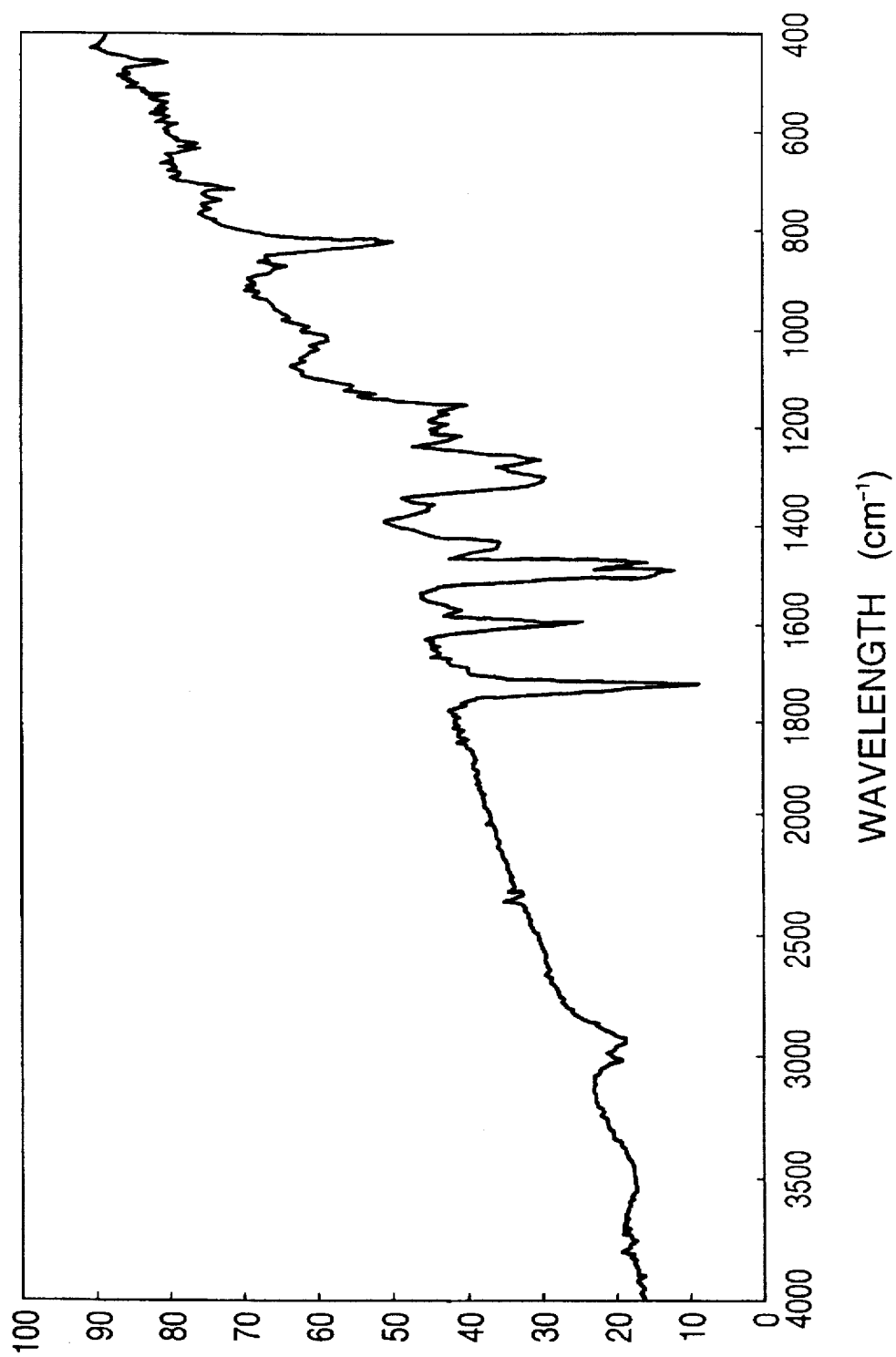
FIG. 3 is an IR spectrum of the compound prepared in Synthesis Example 3.

Into a 500-ml flask were introduced 4.5 g of N-(3,4-dimethylphenyl)-N-[4-(2-methoxycarbonylethyl)phenyl]amine, 3.0 g of 4,4'-diiodo-3,3'-dimethylbiphenyl, 2.7 g of potassium carbonate, 0.5 g of copper sulfate pentahydrate, and 5 ml of n-tridecane. The reactants were reacted with heating at 230° C. for 5 hours under an atmosphere of nitrogen. After the reaction, the reaction mixture was cooled to room temperature and then dissolved in 20 ml of toluene. Insolubles were filtered off, and the filtrate was purified by silica gel column chromatography using toluene, followed by recrystallization from a mixed solvent of ethyl acetate and ethanol. As a result, 3.8 g of 3,3'-dimethyl-N,N'-bis(3,4-dimethylphenyl)-N,N'-bis[4-(2-methoxycarbonylethyl)phenyl]-[1,1'-biphenyl]-4,4'-diamine was obtained as a light yellow powder (melting point: 162°–163° C.). An IR spectrum of this compound is shown in FIG. 3.

SYNTHESIS EXAMPLE 4

(Synthesis of 3,3'-Dimethyl-N,N'-bis(4-methoxyphenyl)-N,N'-bis[4-(2-methoxycarbonylethyl)phenyl]-[1,1,-biphenyl]-4,4'-diamine)

Figure 4:
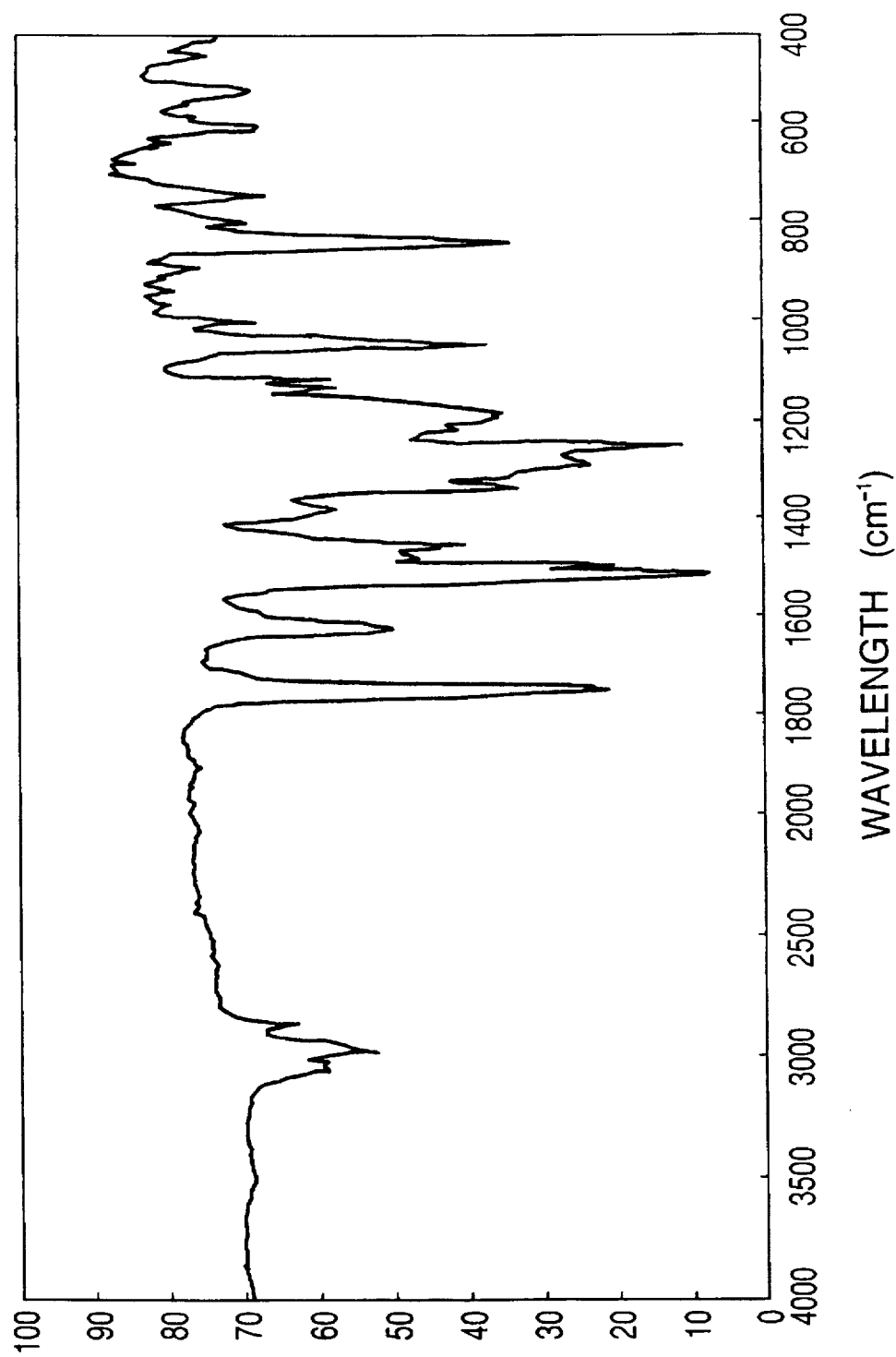
FIG. 4 is an IR spectrum of the compound prepared in Synthesis Example 4.

Into a 100-ml flask were introduced 5.0 g of N-(4-methoxyphenyl)-N-[4-(2-methoxycarbonylethyl)phenyl]amine, 3.4 g of 4,4'-diiodo-3,3'-dimethylbiphenyl, 2.9 g of potassium carbonate, 0.5 g of copper sulfate pentahydrate, and 5 ml of n-tridecane. The reactants were reacted with heating at 230° C. for 15 hours under an atmosphere of nitrogen. After the reaction, the reaction mixture was cooled to room temperature and then dissolved in 20 ml of toluene. Insolubles were filtered off, and the filtrate was purified by silica gel column chromatography using toluene. As a result, 5.3 g of 3,3'-dimethyl-N,N'-bis(4-methoxyphenyl)-N,N'-bis[4-(2-methoxycarbonylethyl)phenyl]-[1,1'-biphenyl]-4,4'-diamine was obtained as an oily substance. An IR spectrum of this compound is shown in FIG. 4.

SYNTHESIS EXAMPLE 5

(Synthesis of N,N'-bis(3,4-dimethylphenyl)-N,N'-bis[4-(2-methoxycarbonylethyl)phenyl]-[1,1':4',1"-terphenyl]-4,4"-diamine)

Figure 5:
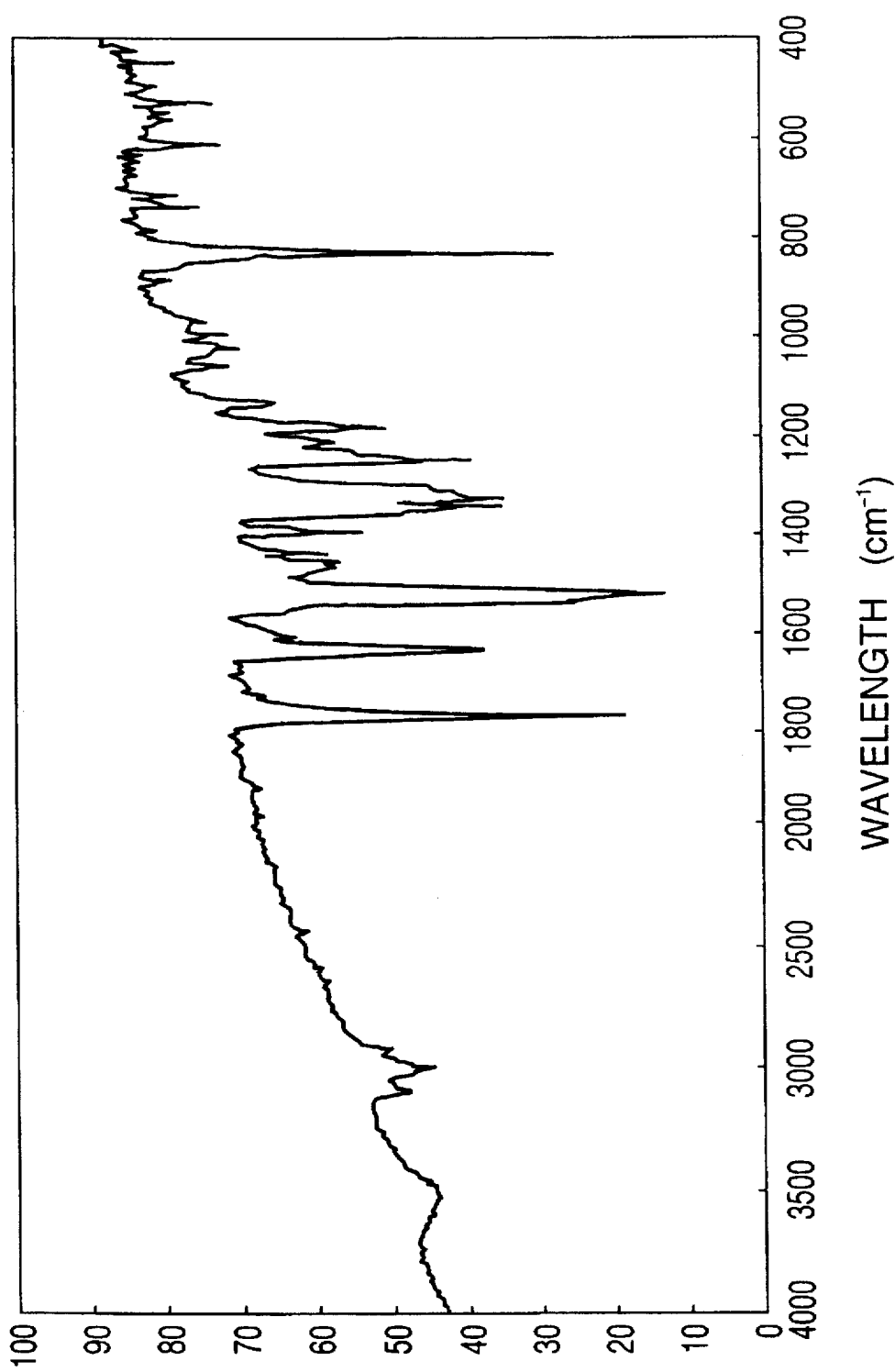
FIG. 5 is an IR spectrum of the compound prepared in Synthesis Example 5.

Into a 200-ml flask were introduced 5.0 g of N-(3,4-dimethylphenyl)-N-[4-(2-methoxycarbonylethyl)phenyl]amine, 3.8 g of 4,4"-diiodo-1,1':4',1"-terphenyl, 2.9 g of potassium carbonate, 1.0 g of copper sulfate pentahydrate, and 10 ml of n-tridecane. The reactants were reacted with heating at 230° C. for 5 hours under an atmosphere of nitrogen. After the reaction, the reaction mixture was cooled to room temperature and then dissolved in 20 ml of toluene. Insolubles were filtered off, and the filtrate was purified by silica gel column chromatography using toluene, followed by recrystallization from acetone. As a result, 3.7 g of N,N'-bis(3,4-dimethylphenyl)-N,N'-bis[4-(2-methoxycarbonylethyl)phenyl]-[1,1':4',1"-terphenyl]-4,4"-diamine was obtained as a light yellow powder (melting point: 146°–147° C.). An IR spectrum of this compound is shown in FIG. 5.

SYNTHESIS EXAMPLE 6

(Synthesis of 3,3'-Dimethyl-N,N'-bis(3,4-dimethylphenyl)-N,N'-bis(4-methoxycarbonylmethylphenyl)-[1,1'-biphenyl]-4,4'-diamine)

Figure 6:
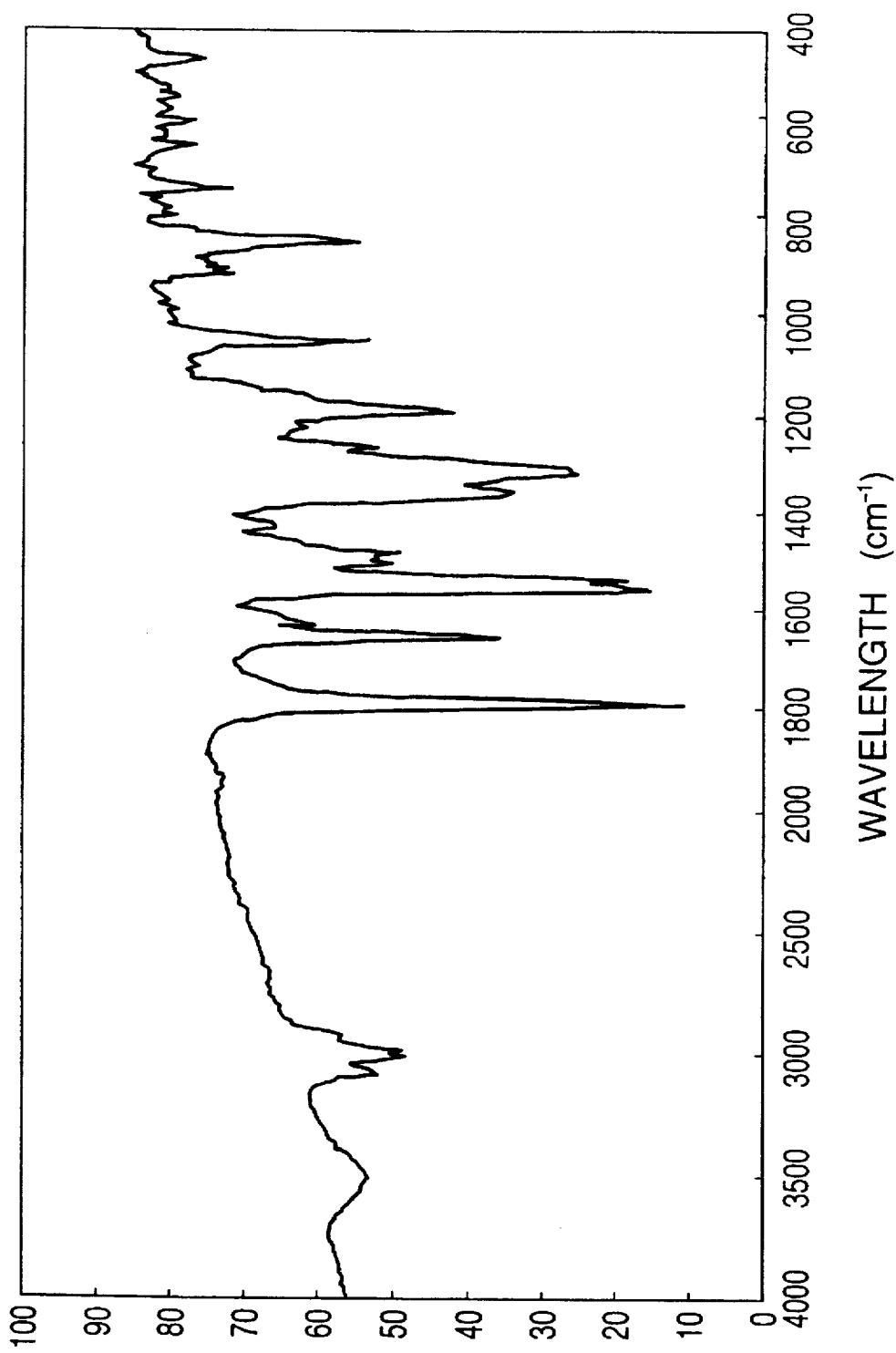
FIG. 6 is an IR spectrum of the compound prepared in Synthesis Example 6.

Into a 200-ml flask were introduced 9.0 g of N-(3,4-dimethylphenyl)-N-(4-methoxycarbonylmethylphenyl)amine, 6.2 g of 4,4'-diiodo-3,3'-dimethylbiphenyl, 5.5 g of potassium carbonate, 1.0 g of copper sulfate pentahydrate, and 10 ml of n-tridecane. The reactants were reacted with heating at 230° C. for 5 hours under an atmosphere of nitrogen. After the reaction, the reaction mixture was cooled to room temperature and then dissolved in 40 ml of toluene. Insolubles were filtered off, and the filtrate was purified by silica gel column chromatography using toluene, followed by recrystallization from a mixed solvent of ethyl acetate and ethanol. As a result, 7.1 g of 3,3'-dimethyl-N,N'-bis(3,4-dimethylphenyl)-N,N'-bis(4-methoxycarbonylmethylphenyl)-[1,1'-biphenyl]-4,4'-diamine was obtained as a light yellow powder (melting point: 179°–181° C.). An IR spectrum of this compound is shown in FIG. 6.

SYNTHESIS EXAMPLE 7

To 230 parts of quinoline were added 30 parts of 1,3-diiminoisoindoline and 9.1 parts of gallium trichloride. The reactants were reacted at 200° C. for 3 hours under an atmosphere of nitrogen. The reaction mixture was filtered to obtain a reaction product, which was washed with acetone and methanol. The resulting wet cake was dried to obtain 28 parts of chlorogallium phthalocyanine crystals. Three parts of the chlorogallium phthalocyanine crystals obtained were dry-ground for 3 hours with an automatic mortar (Lab-Mill UT-21, manufactured by Yamato Kagaku K.K., Japan). The ground crystals in an amount of 0.5 parts were milled with 60 parts of glass beads (1 mm$\phi$) in 20 parts of benzyl alcohol at room temperature for 24 hours. The glass beads were then filtered off, and the milled crystals were washed with 10 parts of methanol and dried. Thus, chlorogallium phthalocyanine crystals having strong diffraction peaks at the angle ($2\theta\pm0.2°$) of 7.4°, 16.6°, 25.5°, and 28.3° when measured by X-ray diffractometry were obtained. This phthalocyanine is referred to as CG-1.

SYNTHESIS EXAMPLE 8

To 350 ml of 1-chloronaphthalene were added 50 g of phthalonitrile and 27 g of anhydrous stannic chloride. The reactants were reacted at 195° C. for 5 hours under an atmosphere of nitrogen. The reaction mixture was filtered to obtain a reaction product, which was washed with 1-chloronaphthalene, acetone, methanol, and then water and subsequently dried at a reduced pressure to obtain 18.3 g of dichlorotin phthalocyanine crystals. Five grams of the dichlorotin phthalocyanine crystals obtained were placed in an agate pot along with 10 g of common salt and 500 g of agate balls (20 mm$\phi$) and ground in a planetary ball mill (Type P-5, manufactured by Flitche Co.) at 400 rpm for 10 hours. The ground crystals were then sufficiently washed with water and dried. 0.5 grams of the dried crystals were milled along with 15 g of THF and 30 g of glass beads (1 mm$\phi$) at room temperature for 24 hours. The glass beads were then filtered off, and the milled crystals were washed with methanol and dried. Thus, dichlorotin phthalocyanine crystals having strong diffraction peaks at 8.5°, 11.2°, 14.5°, and 27.2° were obtained. This phthalocyanine is referred to as CG-2.

SYNTHESIS EXAMPLE 9

Into 60 parts of concentrated sulfuric acid at 0° C. were dissolved 3 parts of the chlorogallium phthalocyanine crystals obtained in Synthesis Example 3. This solution was dropwise added into 450 parts of distilled water having a temperature of 5° C. to reprecipitate crystals. The reprecipitated crystals were washed with distilled water, dilute ammonia water, etc. and then dried to obtain 2.5 parts of hydroxygallium phthalocyanine crystals. The crystals obtained were ground with an automatic mortar for 5.5 hours, and 0.5 g parts of the ground crystals were milled for 24 hours along with 15 parts of dimethylformamide and 30 parts of glass beads having a diameter of 1 mm. Thereafter, the crystals were separated, washed with methanol, and then dried. Thus, hydroxygallium phthalocyanine crystals having strong peaks at 7.5°, 9.9°, 12.5°, 16.3°, 18.6°, 25.1°, and 28.3° were obtained. This phthalocyanine is referred to as CG-3.

SYNTHESIS EXAMPLE 10

To 200 parts of 1-chloronaphthalene were added 30 parts of 1,3-diiminoisoindoline and 17 parts of titanium tetrabutoxide. The reactants were reacted at 190° C. for 5 hours under an atmosphere of nitrogen. The reaction mixture was filtered to obtain a reaction product, which was washed with ammonia water, water, and acetone to obtain 40 parts of oxytitanium phthalocyanine. Five parts of the oxytitanium phthalocyanine crystals obtained were ground for 3 hours with an automatic mortar (Lab-Mill UT-21, manufactured by Yamato Kagaku K.K.) along with 10 parts of sodium chloride. The ground crystals were sufficiently washed with distilled water and dried to obtain 4.8 parts of oxytitanium phthalocyanine crystals. The oxytitanium phthalocyanine crystals obtained showed a distinct peak at 27.3°. Two parts of the oxytitanium phthalocyanine crystals obtained were stirred at 50° C. for 1 hour in a mixed solvent composed of 20 parts of distilled water and 2 parts of monochlorobenzene. The crystals were then recovered by filtration, sufficiently washed with methanol, and dried. Thus, oxytitanium phthalocyanine hydrate crystals having a strong diffraction peak at 27.3° were obtained. This phthalocyanine is referred to as CG-4.

EXAMPLE 1

(Synthesis of Charge-Transporting Polymer (4))

Figure 7:
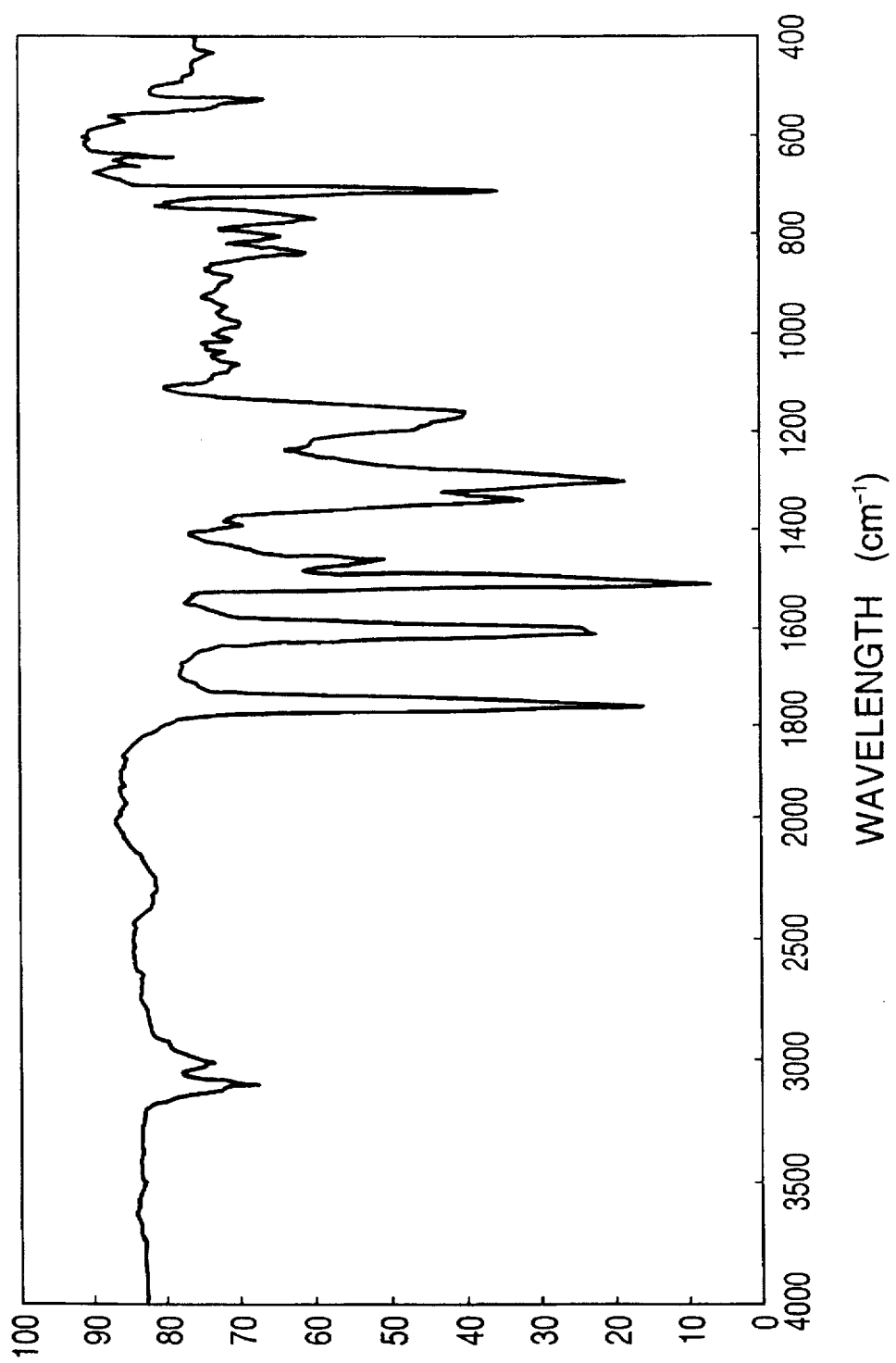
FIG. 7 is an IR spectrum of the charge-transporting polymer (4) obtained in Example 1.

Into a 50-ml flask were introduced 0.5 g of the N,N'-diphenyl-N,N'-bis[3-(2-ethoxycarbonylethyl)phenyl]-[1,1'-biphenyl]-4,4'-diamine obtained in Synthesis Example 1, 1.0 g of ethylene glycol, and 0.03 g of tetrabutoxytitanium. The mixture was heated with refluxing for 3 hours under an atmosphere of nitrogen. After the N,N'-diphenyl-N,N'-bis[3-(2-ethoxycarbonylethyl)phenyl]-[1,1'-biphenyl]-4,4'-diamine was ascertained to have been consumed, the pressure was reduced to 0.5 mmHg, and the reaction mixture was heated to 230° C. while distilling off the ethylene glycol. The reaction was then continued for 3 hours. Thereafter, the reaction mixture was cooled to room temperature and dissolved into 50 ml of methylene chloride. Insolubles were filtered off, and the filtrate was dropwise added into 100 ml of acetone which was kept being stirred. Thus, a polymer was precipitated. The polymer obtained was dissolved into 50 ml of THF, and a filtrate obtained therefrom was dropwise added into 300 ml of water kept being stirred to precipitate a polymer. This polymer was sufficiently washed with water and then dried to obtain 0.25 g of a polymer. The molecular weight of this polymer was measured by GPC. As a result, $M_w=1.13\times10^5$ (calculated for standard polystyrene). (The degree of polymerization, p, was about 170.) An IR spectrum thereof is shown in FIG. 7.

EXAMPLE 2

(Synthesis of Charge-Transporting Polymer (11))

Into a 50-ml flask were introduced 1.03 g of N,N'-diphenyl-N,N'-bis[3-(2-ethoxycarbonylethyl)phenyl]-[1,1'-biphenyl]-4,4'-diamine, 2.0 g of ethylene glycol, and 0.06 g of tetrabutoxytitanium. The mixture was heated with refluxing for 3 hours under an atmosphere of nitrogen. After the N,N'-diphenyl-N,N'-bis[3-(2-ethoxycarbonylethyl)phenyl]-

Figure 8:
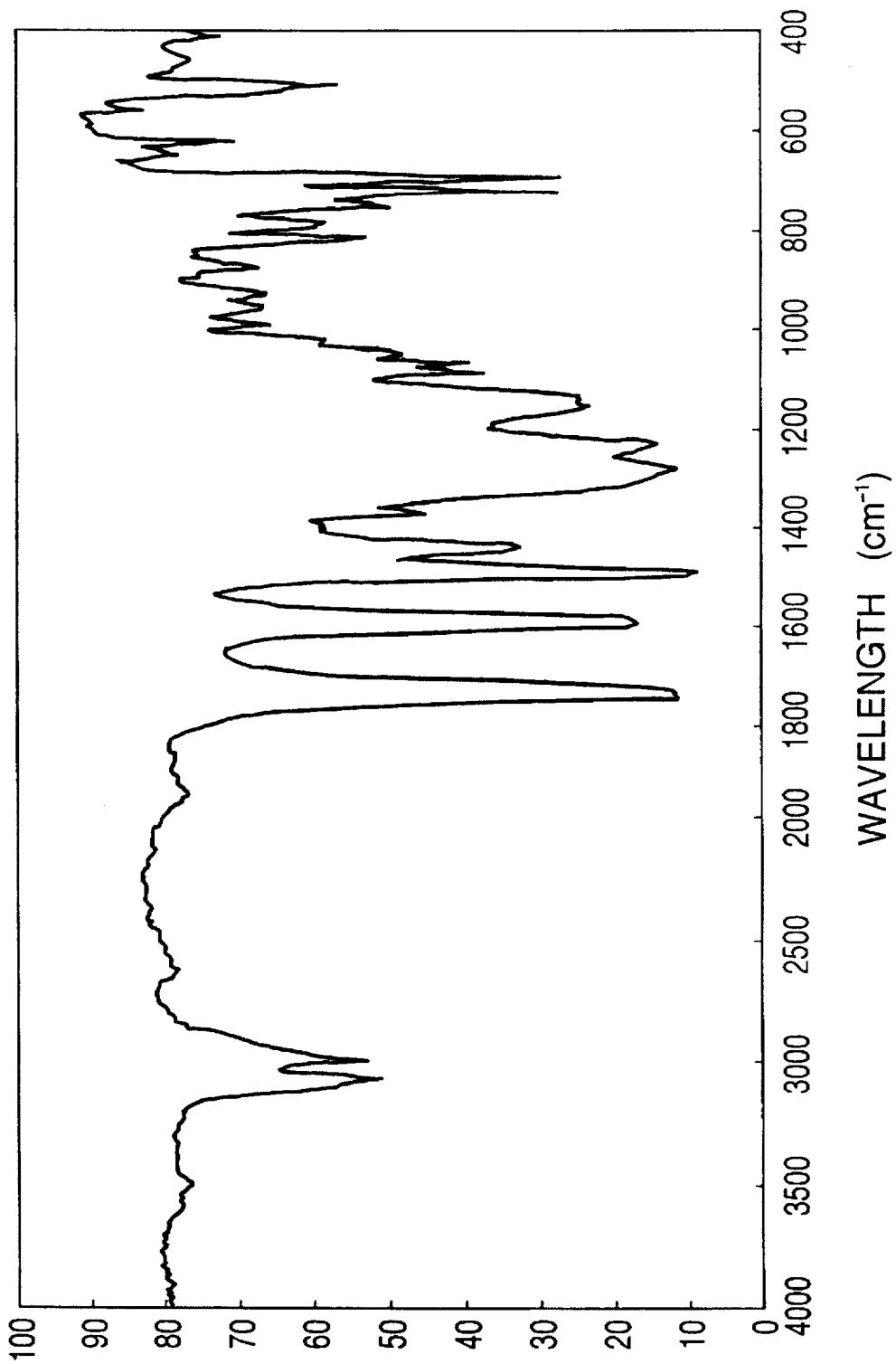
FIG. 8 is an IR spectrum of the charge-transporting polymer (11) obtained in Example 2.

[1,1'-biphenyl]-4,4'-diamine was ascertained to have been consumed, the pressure was reduced to 0.5 mmHg to distill off the ethylene glycol. Thereafter, the reaction mixture was cooled to room temperature and dissolved into 20 ml of methylene chloride. To this solution was added dropwise a solution of 0.30 g of isophthaloyl dichloride in 10 ml of methylene chloride. Thereto was further added 0.61 g of triethylamine. This mixture was heated with refluxing for 30 minutes. Thereafter, 0.3 ml of methanol was added thereto, and this mixture was further heated with refluxing. The resulting insoluble matter was filtered off, and the filtrate was dropwise added into 300 ml of ethanol kept being stirred. Thus, a polymer was precipitated. The precipitated polymer was taken out by filtration and redissolved into 50 ml of THF. This solution was dropwise added into 300 ml of water kept being stirred to precipitate a polymer. This polymer was sufficiently washed with water and then dried to obtain 0.52 g of a polymer. The molecular weight of this polymer was measured by GPC. As a result, $M_w=1.60\times10^4$ (calculated for standard polystyrene). (The degree of polymerization, p, was about 20.) An IR spectrum thereof is shown in FIG. 8.

EXAMPLE 3

(Synthesis of Charge-Transporting Polymer (15))

Figure 9:
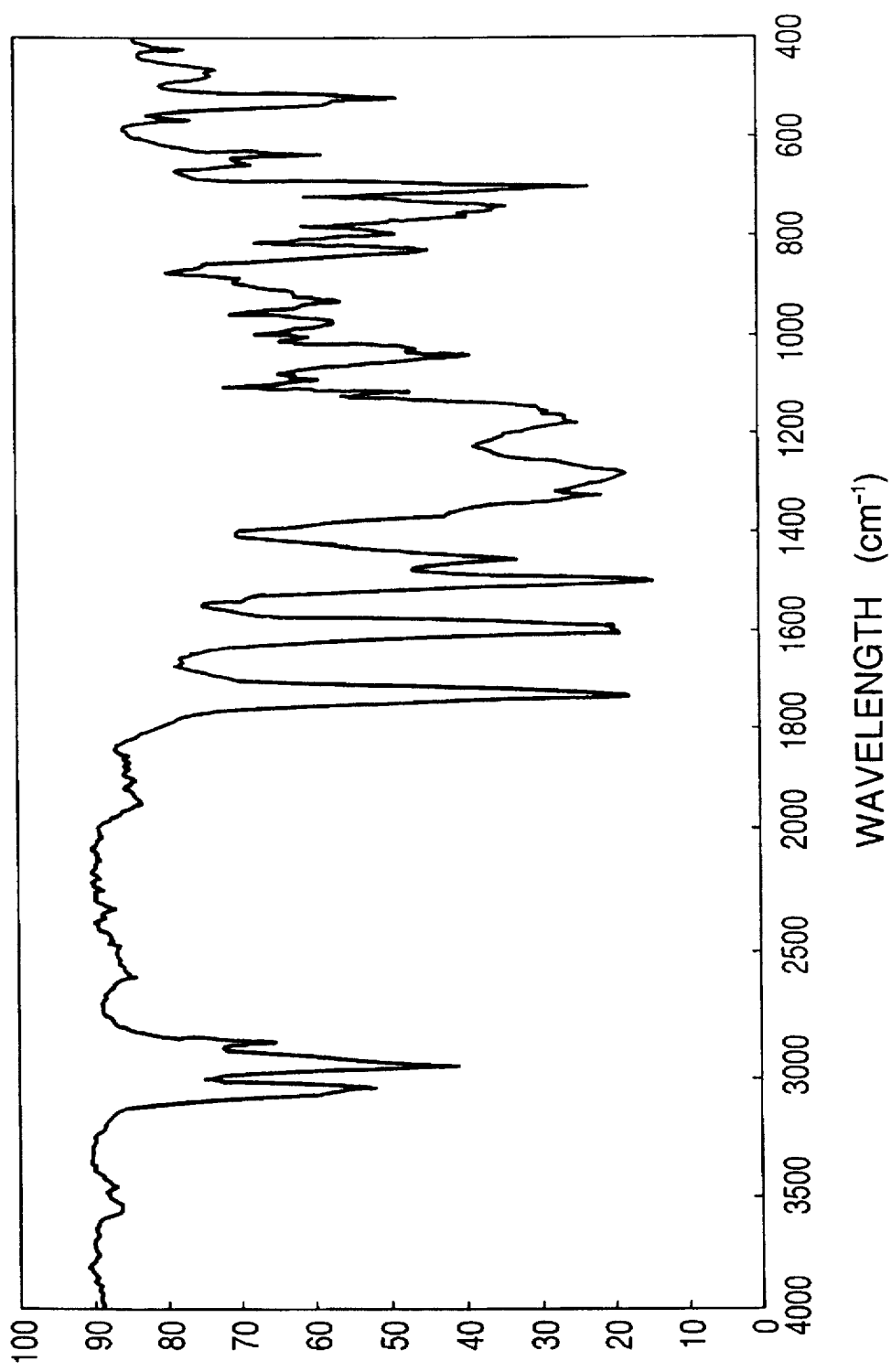
FIG. 9 is an IR spectrum of the charge-transporting polymer (15) obtained in Example 3.

Into a 50-ml flask were introduced 1.02 g of N,N'-diphenyl-N,N'-bis[3-(2-ethoxycarbonylethyl)phenyl]-[1,1'-biphenyl]-4,4'-diamine, 2.0 g of 1,4-cyclohexanediol (cis-trans mixture), and 0.06 g of tetrabutoxytitanium. The mixture was heated with refluxing for 2 hours under an atmosphere of nitrogen. After the N,N'-diphenyl-N,N'-bis[3-(2-ethoxycarbonylethyl)phenyl]-[1,1'-biphenyl]-4,4'-diamine was ascertained to have been consumed, the pressure was reduced to 0.5 mmHg, and the reaction mixture was heated to 230° C. while distilling off the 1,4-cyclohexanediol. The reaction was then continued for 5 hours. Thereafter, the reaction mixture was cooled to room temperature and dissolved into 50 ml of methylene chloride. Insolubles were filtered off, and the filtrate was dropwise added into 300 ml of ethanol kept being stirred. Thus, a polymer was precipitated. This polymer was sufficiently washed with ethanol and water and then dried to obtain 0.86 g of a polymer. The molecular weight of this polymer was measured by GPC. As a result, $M_w=2.77\times10^4$ (calculated for standard polystyrene). (The degree of polymerization, p, was about 35.) Am IR spectrum thereof is shown in FIG. 9.

EXAMPLE 4

(Synthesis of Charge-Transporting Polymer (19))

Figure 10:
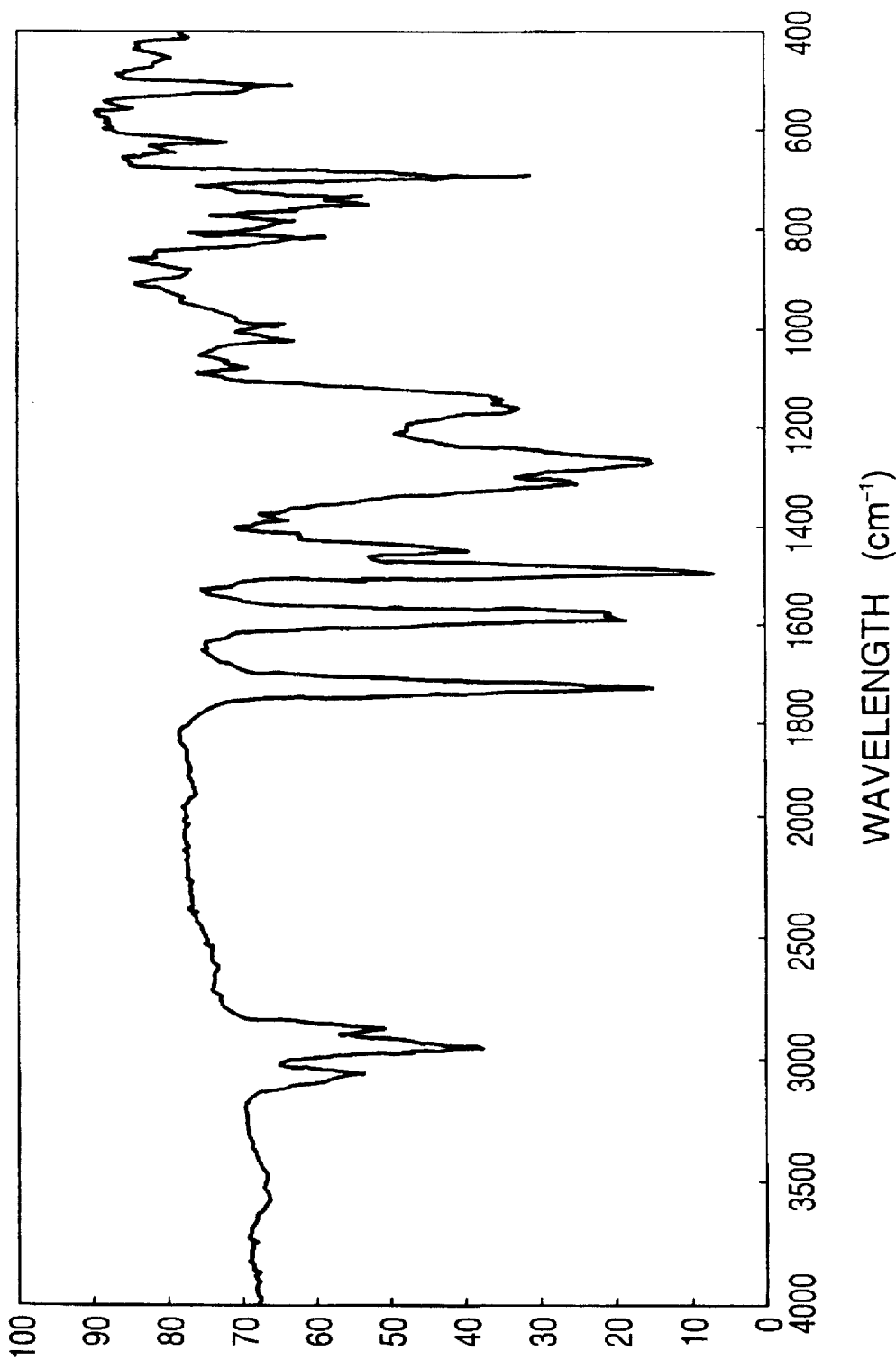
FIG. 10 is an IR spectrum of the charge-transporting polymer (19) obtained in Example 4.

Into a 50-ml flask were introduced 1.21 g of N,N'-diphenyl-N,N'-bis[3-(2-ethoxycarbonylethyl)phenyl]-[1,1'-biphenyl]-4,4'-diamine, 2.0 g of 1,4-cyclohexanedimethanol (cis-trans mixture), and 0.06 g of tetrabutoxytitanium. The mixture was heated with refluxing for 2 hours under an atmosphere of nitrogen. After the N,N'-diphenyl-N,N'-bis[3-(2-ethoxycarbonylethyl)phenyl]-[1,1'-biphenyl]-4,4'-diamine was ascertained to have been consumed, the pressure was reduced to 0.5 mmHg, and the reaction mixture was heated to 230° C. while distilling off the 1,4-cyclohexanedimethanol. The reaction was then continued for 4 hours. Thereafter, the reaction mixture was cooled to room temperature and dissolved into 50 ml of methylene chloride. Insolubles were filtered off, and the filtrate was dropwise added into 300 ml of ethanol kept being stirred. Thus, a polymer was precipitated. This polymer was sufficiently washed with ethanol and water and then dried to obtain 0.82 g of a polymer. The molecular weight of this polymer was measured by GPC. As a result, $M_w=2.49\times10^4$ (calculated for standard polystyrene). (The degree of polymerization, p, was about 30.) An IR spectrum thereof is shown in FIG. 10.

EXAMPLE 5

(Synthesis of Charge-Transporting Polymer (1))

Figure 11:
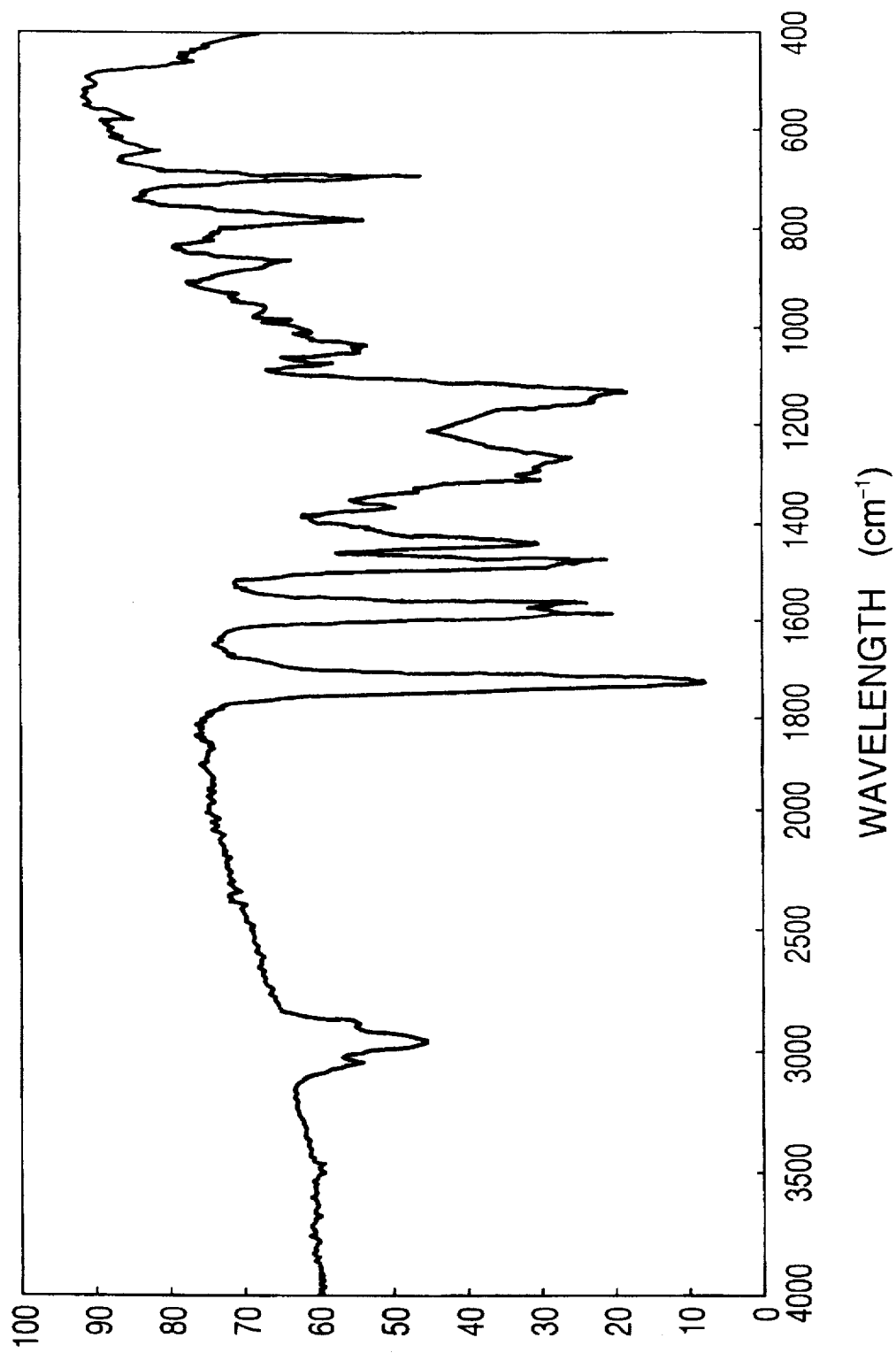
FIG. 11 is an IR spectrum of the charge-transporting polymer (1) obtained in Example 5.

Into a 50-ml flask were introduced 0.4 g of N,N'-bis[3-(2-ethoxycarbonylethyl)phenyl]-3,4-xylidine, 1.0 g of ethylene glycol, and 0.03 g of tetrabutoxytitanium. The mixture was heated with refluxing for 3 hours under an atmosphere of nitrogen. After the N,N'-bis[3-(2-ethoxycarbonylethyl)phenyl]-3,4-xylidine was ascertained to have been consumed, the pressure was reduced to 0.5 mmHg, and the reaction mixture was heated to 230° C. while distilling off the ethylene glycol. The reaction was then continued for 3 hours. Thereafter, the reaction mixture was cooled to room temperature and dissolved into 50 ml of tetrahydrofuran. Insolubles were filtered off, and the filtrate was dropwise added into 400 ml of water kept being stirred. Thus, a polymer was precipitated. This polymer was sufficiently washed with water and then dried to obtain 0.36 g of a polymer. The molecular weight of this polymer was measured by GPC. As a result, $M_w=1.10\times10^5$ (calculated for standard polystyrene). (The degree of polymerization, p, was about 240.) An IR spectrum thereof is shown in FIG. 11.

EXAMPLE 6

(Synthesis of Charge-Transporting Polymer (58))

Figure 12:
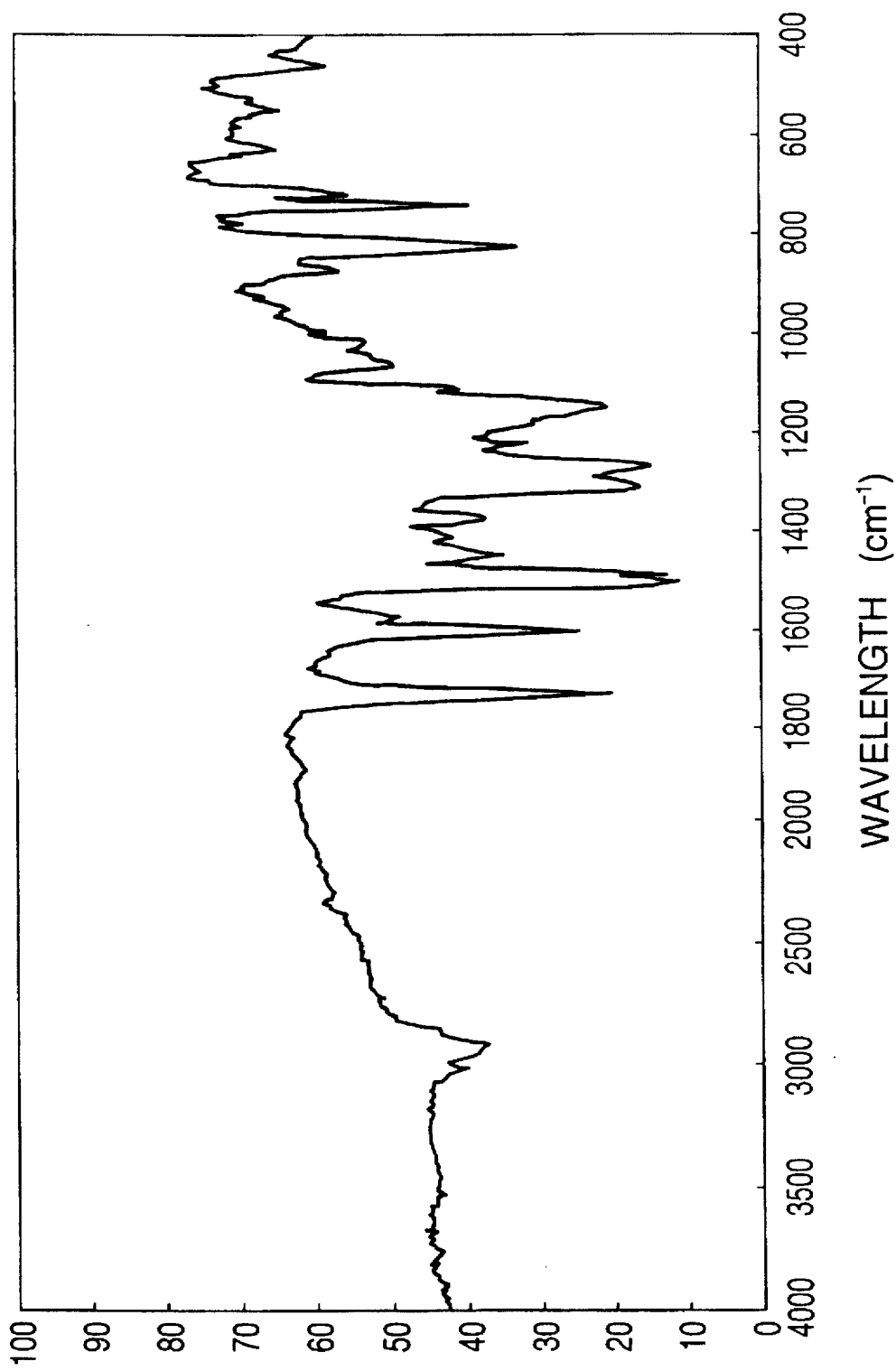
FIG. 12 is an IR spectrum of the charge-transporting polymer (58) obtained in Example 6.

Into a 50 ml flask were introduced 2.0 g of 3,3'-dimethyl-N,N'-bis(3,4-dimethylphenyl)-N,N'-bis[4-(2-methoxycarbonylethyl)phenyl]-[1,1'-biphenyl]-4,4'-diamine, 4.0 g of ethylene glycol, and 0.1 g of tetrabutoxytitanium. The mixture was heated with refluxing for 3 hours under an atmosphere of nitrogen. After the 3,3'-dimethyl-N,N'-bis(3,4-dimethylphenyl)-N,N'-bis[4-(2-methoxycarbonylethyl)phenyl]-[1,1'-biphenyl]-4,4'-diamine was ascertained to have been consumed, the pressure was reduced to 0.5 mmHg, and the reaction mixture was heated to 230° C. while distilling off the ethylene glycol. The reaction was then continued for 3 hours. Thereafter, the reaction mixture was cooled to room temperature and dissolved into 50 ml of methylene chloride. Insolubles were filtered off, and the filtrate was dropwise added into 250 ml of ethanol kept being stirred. Thus, a polymer was precipitated. This polymer was sufficiently washed with ethanol and then dried to obtain 1.9 g of a polymer. The molecular weight of this polymer was measured by GPC. As a result, $M_w=1.23\times10^5$ (calculated for standard polystyrene). (The degree of polymerization, p, was about 160.) An IR spectrum thereof is shown in FIG. 12.

EXAMPLE 7

(Synthesis of Charge-Transporting Polymer (63))

Figure 13:
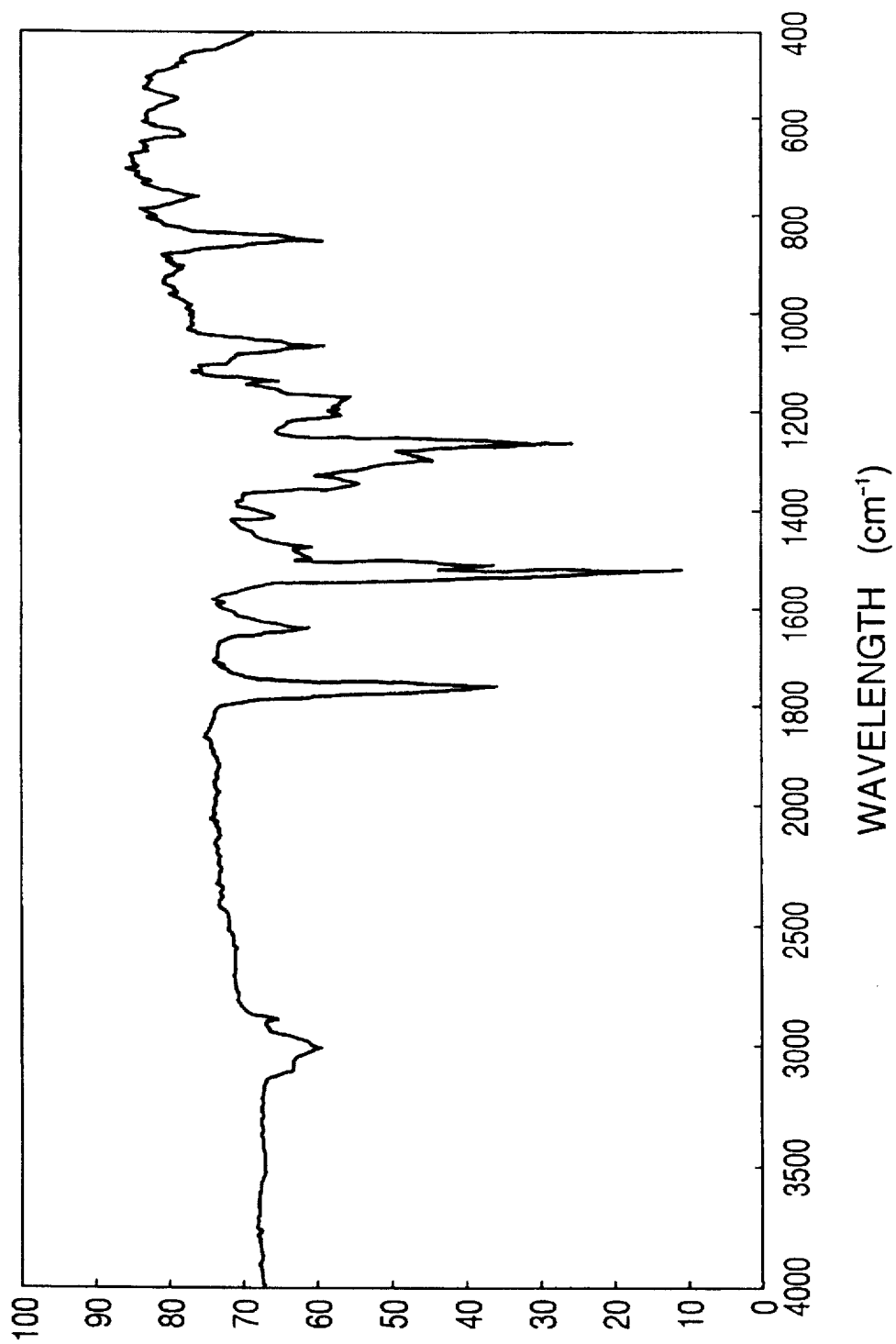
FIG. 13 is an IR spectrum of the charge-transporting polymer (63) obtained in Example 7.

Into a 50-ml flask were introduced 1.0 g of 3,3'-dimethyl-N,N'-bis(4-methoxyphenyl)-N,N'-bis[4-(2-methoxycarbonylethyl)phenyl]-[1,1'-biphenyl]-4,4'-diamine, 2.0 g of ethylene glycol, and 0.01 g of tetrabutoxytitanium. The mixture was heated with refluxing for 3 hours under an atmosphere of nitrogen. After the 3,3'-dimethyl-N,N'-bis(4-methoxyphenyl)-N,N'-bis[4-(2-methoxycarbonylethyl)phenyl]-[1,1'-biphenyl]-4,4'-diamine was ascertained to have been consumed, the pressure was reduced to 0.5 mmHg, and the reaction mixture was heated to 230° C. while distilling off the ethylene glycol. The reaction was then continued for 3 hours. Thereafter, the reaction mixture was cooled to room temperature and dissolved into 30 ml of methylene chloride. Insolubles were filtered off, and the filtrate was dropwise added into 150 ml of ethanol kept being stirred. Thus, a polymer was precipitated. This polymer was sufficiently washed with ethanol and then dried to obtain 0.9 g of a polymer. The molecular weight of this polymer was measured by GPC. As a result, $M_w=1.13\times10^5$ (calculated for standard polystyrene). (The degree of polymerization, p, was about 150.) An IR spectrum thereof is shown in FIG. 13.

EXAMPLE 8

(Synthesis of Charge-Transporting Polymer (73))

Figure 14:
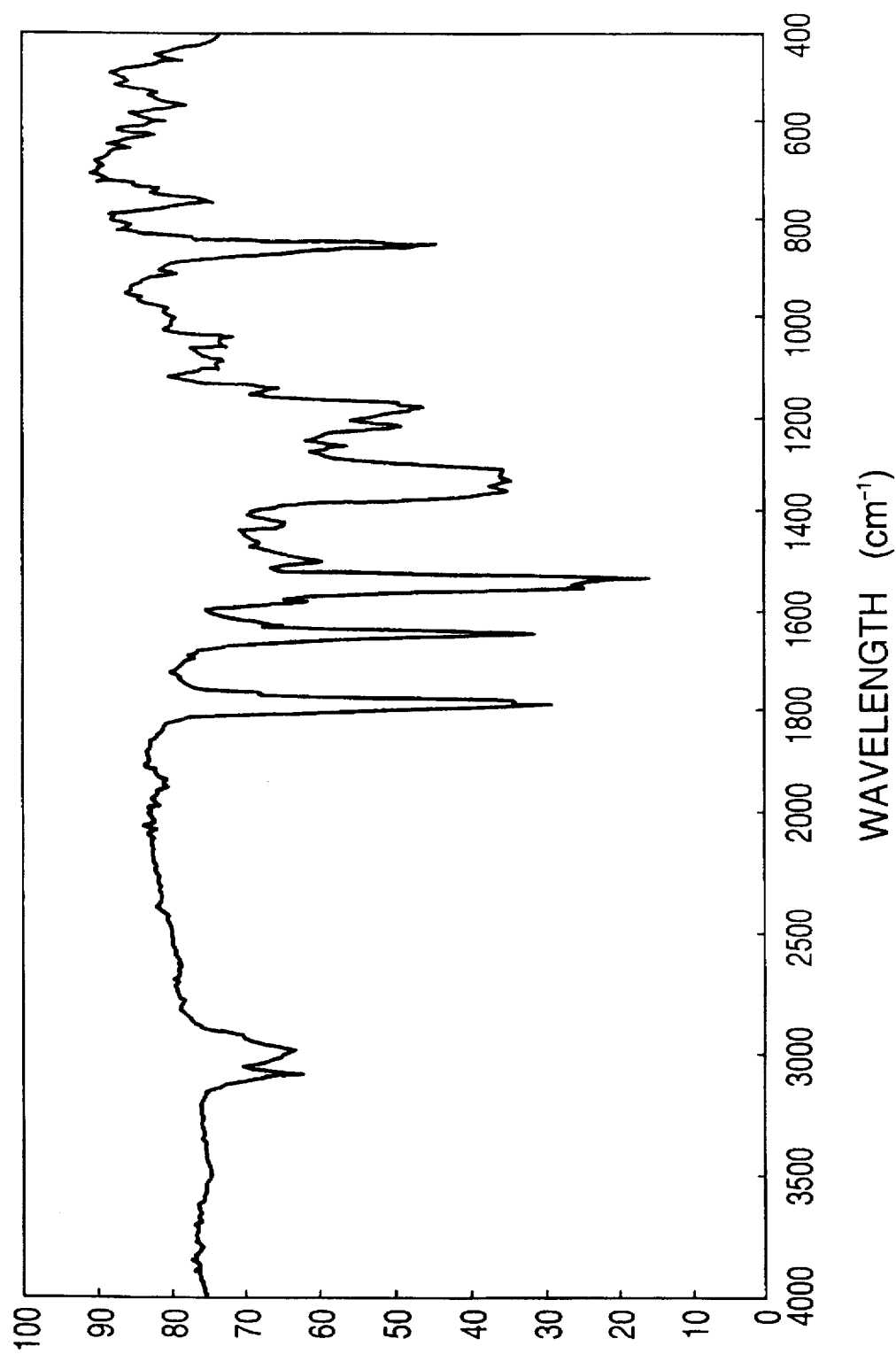
FIG. 14 is an IR spectrum of the charge-transporting polymer (73) obtained in Example 8.

Into a 50 ml flask were introduced 1.0 g of N,N'-bis(3,4-dimethylphenyl)-N,N'-bis[4-(2-methoxycarbonylethyl)phenyl]-[1,1':4',1''-terphenyl]-4,4''-diamine as prepared in Synthesis Example 5, 2.0 g of ethylene glycol, and 0.03 g of tetrabutoxytitanium. The mixture was heated with refluxing for 3 hours under an atmosphere of nitrogen. After the N,N'-bis(3,4-dimethylphenyl)-N,N'-bis[4-(2-methoxycarbonylethyl)phenyl]-[1,1':4',1''-terphenyl]-4,4''-diamine was ascertained to have been consumed, the pressure was reduced to 0.5 mmHg, and the reaction mixture was heated to 230° C. while distilling off the ethylene glycol. The reaction was then continued for 3 hours. Thereafter, the reaction mixture was cooled to room temperature and dissolved into 20 ml of methylene chloride. Insolubles were filtered off, and the filtrate was dropwise added into 100 ml of ethanol kept being stirred. Thus, a polymer was precipitated. This polymer was sufficiently washed with ethanol and then dried to obtain 0.92 g of a polymer. The molecular weight of this polymer was measured by GPC. As a result, $M_w=1.23\times10^5$ (calculated for standard polystyrene). (The degree of polymerization, p, was about 155.) An IR spectrum thereof is shown in FIG. 14.

EXAMPLE 9

(Synthesis of Charge-Transporting Polymer (67))

Figure 15:
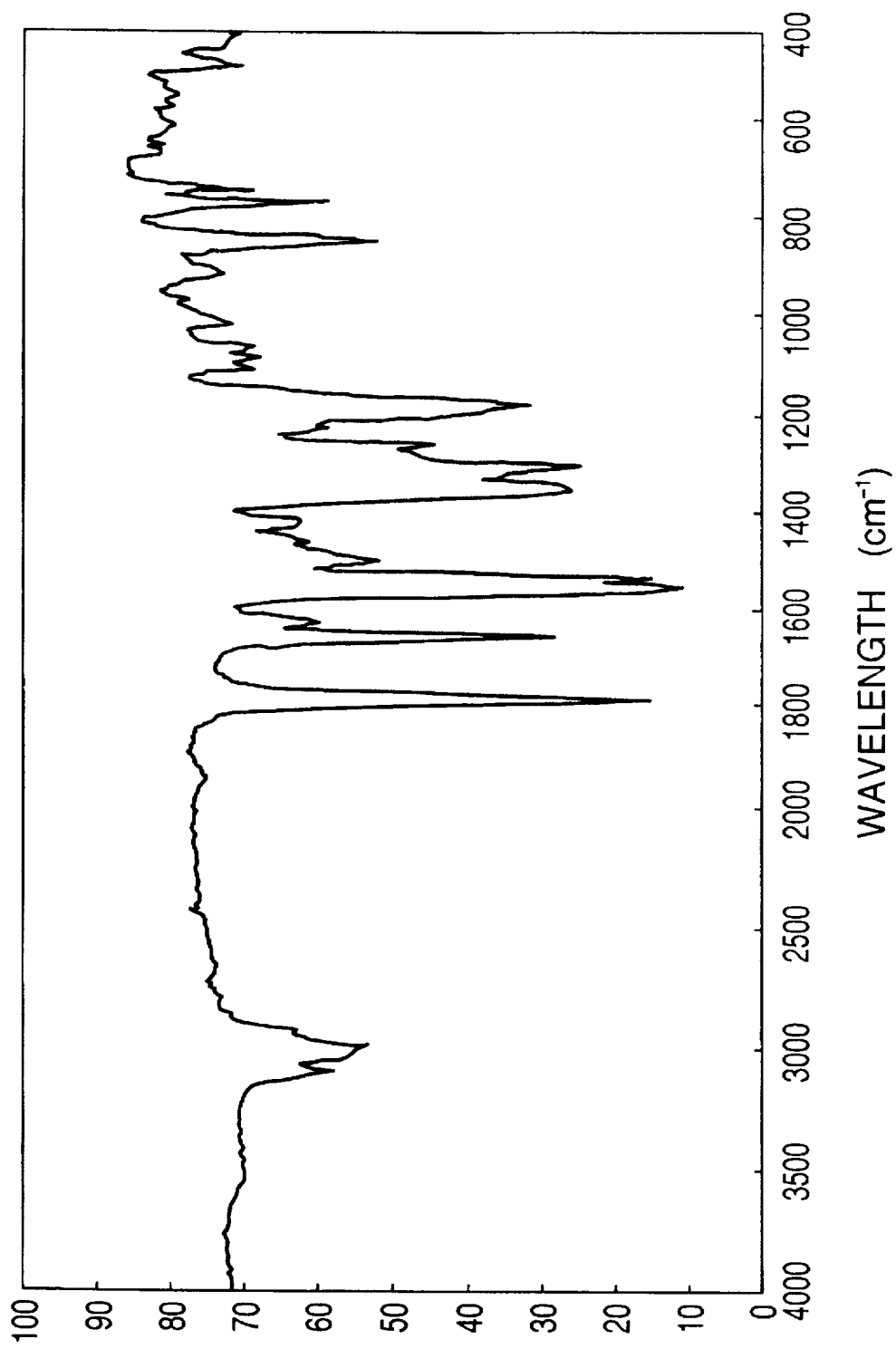
FIG. 15 is an IR spectrum of the charge-transporting polymer (67) obtained in Example 9.

Into a 50-ml flask were introduced 1.0 g of 3,3'-dimethyl-N,N'-bis(3,4-dimethylphenyl)-N,N'-bis(4-methoxycarbonylmethylphenyl)-[1,1'-biphenyl]-4,4'-diamine obtained in Synthesis Example 6, 2.0 g of ethylene glycol, and 0.03 g of tetrabutoxytitanium. The mixture was heated with refluxing for 3 hours under an atmosphere of nitrogen. After the 3,3'-dimethyl-N,N'-bis(3,4-dimethylphenyl)-N,N'-bis(4-methoxycarbonylmethylphenyl)-[1,1'-biphenyl]-4,4'-diamine was ascertained to have been consumed, the pressure was reduced to 0.5 mmHg, and the reaction mixture was heated to 230° C. while distilling off the ethylene glycol. The reaction was then continued for 3 hours. Thereafter, the reaction mixture was cooled to room temperature and dissolved into 20 ml of methylene chloride. Insolubles were filtered off, and the filtrate was dropwise added into 100 ml of ethanol being stirred. Thus, a polymer was precipitated. This polymer was sufficiently washed with ethanol and then dried to obtain 0.91 g of a polymer. The molecular weight of this polymer was measured by GPC. As a result, $M_w=1.08\times10^5$ (calculated for standard polystyrene). (The degree of polymerization, p, was about 150.) An IR spectrum thereof is shown in FIG. 15.

EXAMPLE 10

(Synthesis of Charge-Transporting Polymer (70))

Figure 16:
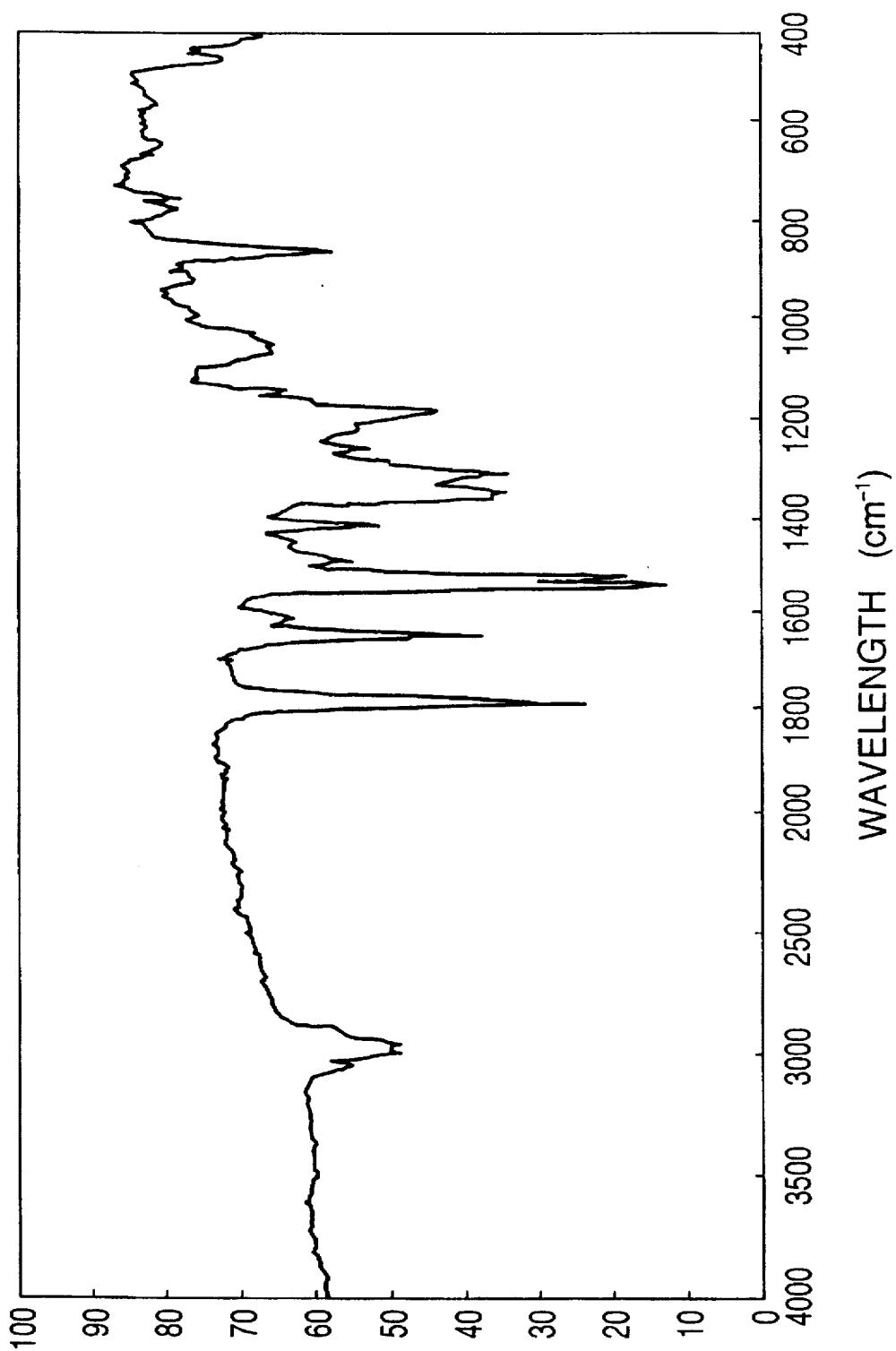
FIG. 16 is an IR spectrum of the charge-transporting polymer (70) obtained in Example 10.

Into a 50-ml flask were introduced 1.0 g of 3,3'-dimethyl-N,N'-bis(3,4-dimethylphenyl)-N,N'-bis[4-(2-methoxycarbonylethyl)phenyl]-[1,1'-biphenyl]-4,4'-diamine, 3.0 g of 2,2-dimethyl-1,3-propanediol, and 0.1 g of tetrabutoxytitanium. The mixture was heated with refluxing for 3 hours under an atmosphere of nitrogen. After the 3,3'-dimethyl-N,N'-bis(3,4-dimethylphenyl)-N,N'-bis[4-(2-(methoxycarbonylethyl)phenyl)]-[1,1'-biphenyl]-4,4'-diamine was ascertained to have been consumed, the pressure was reduced to 0.5 mmHg, and the reaction mixture was heated to 230° C. while distilling off the 2,2-dimethyl-1,3-propanediol. The reaction was then continued for 3 hours. Thereafter, the reaction mixture was cooled to room temperature and dissolved into 20 ml of methylene chloride. Insolubles were filtered off, and the filtrate was dropwise added into 100 ml of ethanol kept being stirred. Thus, a polymer was precipitated. This polymer was sufficiently washed with ethanol and then dried to obtain 0.6 g of a polymer. The molecular weight of this polymer was measured by GPC. As a result, $M_w=1.55\times10^5$ (calculated for standard polystyrene). (The degree of polymerization, p, was about 195.) An IR spectrum thereof is shown in FIG. 16.

EXAMPLE 11

A solution containing 10 parts of a zirconium compound (Orgatics ZC540, manufactured by Matsumoto Seiyaku K.K., Japan), 1 part of a silane compound (A1110, manufactured by Nippon Unicar Co., Ltd., Japan), 40 parts of isopropanol, and 20 parts of butanol was applied on an aluminum substrate by dip coating. The coating was dried at 150° C. for 10 minutes to form an undercoat layer having a thickness of 0.5 μm. One part of phthalocyanine compound CG-1 was mixed with 1 part of a poly(vinyl butyral) resin (S-Lec BM-S, manufactured by Sekisui Chemical Co., Ltd., Japan) and 100 parts of n-butyl acetate. This mixture was treated for 1 hour with a paint shaker along with glass beads to disperse the CG-1. The coating composition obtained was applied on the undercoat layer by dip coating, and dried at 100° C. for 10 minutes to form a charge generation layer.

A coating composition obtained by dissolving 0.2 parts of charge-transporting polymer (4) into 1.5 parts of monochlorobenzene was then applied, by wire-wound bar coating, on the aluminum substrate on which the charge generation layer had been formed. The coating was dried at 120° C. for 1 hour to form a charge transport layer having a thickness of 15 μm.

The electrophotographic photoreceptor thus obtained was examined for electrophotographic properties as follows. The photoreceptor was subjected to −6 kV corona discharge using an electrostatic copying paper tester (Electrostatic Analyzer EPA-8100, manufactured by Kawaguchi Denki K.K., Japan) in an atmosphere having ordinary temperature and pressure (20° C., 40% RH) to electrify the photoreceptor. The electrified photoreceptor was irradiated with 800 nm monochromatic light obtained from tungsten lamp light using a monochromator, at an irradiance of 1 μW/cm² as measured on the photoreceptor surface. The surface potential $V_0$ (V) and the half decay exposure $E_{1/2}$ (erg/cm²) were measured. Thereafter, the photoreceptor was irradiated with white light at 10 1x for 1 second to measure the residual potential $V_{RP}$ (V). The above electrification/exposure operation was repeated 1,000 times, and the resulting $V_0$, $E_{1/2}$, and $V_{RP}$ were measured. The differences in these properties between the initial and the 1,000th operations are shown as $\Delta V_0$, $\Delta E_{1/2}$, and $\Delta V_{RP}$. The results obtained are shown in Table 2.

EXAMPLES 12 TO 31

Electrophotographic photoreceptors were produced and evaluated in the same manner as in Example 11, except that the charge generation material/charge transport material combinations shown in Table 2 were used. The results obtained are shown in Table 2.

COMPARATIVE EXAMPLE 1

An electrophotographic photoreceptor was produced and evaluated in the same manner as in Example 11, except that 0.2 parts of PVK was used in place of 0.2 parts of charge-transporting polymer (4), and 1 part of phthalocyanine compound CG-2 was used in place of the CG-1. The results obtained are shown in Table 2.

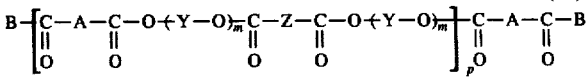

wherein Y represents a divalent hydrocarbon group; Z represents a divalent hydrocarbon group; A represents a group represented by formula (II)

TABLE 2

| Example | Charge Transport Material | Charge Generation Material | Initial Property V0 | E½ (erg/cm²) | VRP (V) | Property at 1,000th Operation V0 (V) | E½ (erg/cm²) | VRP (V) | Stability ΔE½ (erg/cm²) | Durability ΔV0 (V) | ΔVRP (V) |
|---|---|---|---|---|---|---|---|---|---|---|---|
| 11 | (4) | CG-1 | −814 | 2.4 | −21 | −801 | 2.9 | −35 | 0.5 | 13 | 14 |
| 12 | (11) | CG-1 | −809 | 2.5 | −23 | −788 | 3.0 | −39 | 0.5 | 21 | 16 |
| 13 | (11) | CG-4 | −824 | 1.2 | −15 | −813 | 1.4 | −26 | 0.2 | 17 | 11 |
| 14 | (15) | CG-1 | −811 | 2.5 | −24 | −794 | 3.0 | −38 | 0.5 | 17 | 14 |
| 15 | (15) | CG-3 | −822 | 2.2 | −35 | −806 | 2.5 | −47 | 0.3 | 16 | 12 |
| 16 | (19) | CG-1 | −823 | 2.4 | −25 | −813 | 2.9 | −39 | 0.5 | 10 | 14 |
| 17 | (19) | CG-2 | −824 | 2.9 | −19 | −811 | 3.3 | −32 | 0.4 | 13 | 13 |
| 18 | (25) | CG-3 | −813 | 2.1 | −30 | −799 | 2.4 | −41 | 0.3 | 14 | 11 |
| 19 | (29) | CG-2 | −821 | 3.0 | −21 | −809 | 3.5 | −37 | 0.5 | 12 | 16 |
| 20 | (37) | CG-2 | −824 | 3.0 | −23 | −814 | 3.5 | −40 | 0.5 | 10 | 17 |
| 21 | (49) | CG-3 | −815 | 2.2 | −29 | −798 | 2.5 | −44 | 0.3 | 17 | 15 |
| 22* | (4) + (VI) | CG-3 | −810 | 2.1 | −25 | −792 | 2.4 | −40 | 0.3 | 18 | 15 |
| 23 | (58) | CG-1 | −815 | 2.4 | −19 | −803 | 2.8 | −31 | 0.4 | 12 | 12 |
| 24 | (57) | CC-1 | −817 | 2.5 | −22 | −804 | 2.9 | −35 | 0.4 | 13 | 13 |
| 25 | (59) | CG-3 | −824 | 2.1 | −32 | −809 | 2.4 | −44 | 0.3 | 15 | 12 |
| 26 | (60) | CG-4 | −822 | 1.2 | −13 | −808 | 1.4 | −25 | 0.2 | 14 | 12 |
| 27 | (63) | CG-1 | −801 | 2.4 | −18 | −786 | 2.9 | −31 | 0.5 | 15 | 13 |
| 28 | (64) | CG-1 | −799 | 2.4 | −15 | −782 | 2.9 | −29 | 0.5 | 17 | 14 |
| 29 | (73) | CG-1 | −818 | 2.4 | −20 | −807 | 2.8 | −31 | 0.4 | 11 | 11 |
| 30 | (67) | CG-1 | −817 | 2.5 | −24 | −802 | 3.0 | −37 | 0.5 | 15 | 13 |
| 31 | (70) | CG-1 | −824 | 2.5 | −27 | −808 | 3.0 | −43 | 0.5 | 16 | 16 |
| Comp. Ex. 1 | PVK | CG-2 | −834 | 3.4 | −46 | −801 | 4.2 | −76 | 0.8 | 33 | 30 |

Note:
*0.12 parts of charge-transporting polymer (4) and 0.08 parts of the binder resin represented by formula (VI) were used in combination.

The charge-transporting polymer of the present invention, represented by formula (I-1) or (I-2) described above, is a novel substance which is excellent in solubility and film-forming property and can be easily synthesized and whose ionization potential is controllable. In particular, introduction of a biphenyl structure for X in formulae (I-1) and (I-2) provides a charge-transporting polymer having an enhanced mobility and a good charge-injection property. Therefore, the polymer is useful as a charge transport material in the production of organic electronic devices. The organic electronic devices of the present invention, in particular the electrophotographic photoreceptor, have high photosensitivity and high stability to repeated use, as shown in the above Examples.

While the invention has been described in detail and with reference to specific embodiments thereof, it will be apparent to one skilled in the art that various changes and modifications can be made therein without departing from the spirit and scope thereof.

What is claimed is:

1. A charge-transporting polymer represented by formula (I-1) or (I-2)

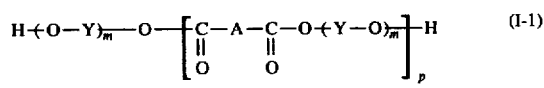

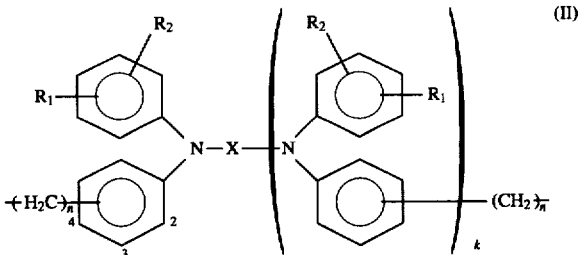

(wherein $R_1$ and $R_2$ each represents a hydrogen atom, an alkyl group, an alkoxy group, a substituted or unsubstituted aryl group, a substituted amino group, or a halogen atom, X represents a substituted or unsubstituted divalent aryl group, n represents an integer of 1 to 5, and k is 0 or 1); B represents a group represented by —O—(Y—O)$_m$—H or —O—(Y—O)$_m$—CO—Z—CO—OR' (wherein R' represents a hydrogen atom, an alkyl group, a substituted or unsubstituted aryl group, or a substituted or unsubstituted aralkyl group); m represents an integer of 1 to 5; and p represents an integer of 5 to 5,000, and wherein the plurality of each of Y, Z, A, B, R', X, $R_1$, $R_2$, m and n in formula (I-1) or (I-2) may be the same as or different from each other.

2. The charge-transporting polymer as claimed in claim 1, wherein said X is a group represented by formula

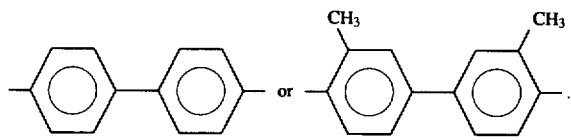

3. An organic electronic device containing a charge-transporting polymer represented by formula (I-1) or (I-2) of claim 1.

4. The organic electronic device as claimed in claim 3, which further contains an insulating polymer compatible with the charge-transporting polymer.

5. The organic electronic device as claimed in claim 3, which is an electrophotographic photoreceptor having a photosensitive layer, said electrophotographic photoreceptor having a surface layer containing the charge-transporting polymer represented by formula (I-1) or (I-2).

6. The organic electronic device as claimed in claim 4, which is an electrophotographic photoreceptor having a photosensitive layer, said electrophotographic photoreceptor having a surface layer containing the charge-transporting polymer represented by formula (I-1) or (I-2).

7. The organic electronic device as claimed in claim 4, which is an electrophotographic photoreceptor having a photosensitive layer containing the charge-transporting polymer represented by formula (I-1) or (I-2) as a charge transport material and containing halogenated gallium phthalocyanine crystals, halogenated tin phthalocyanine crystals, hydroxygallium phthalocyanine crystals, or oxytitanium phthalocyanine crystals as a charge generation material.

* * * * *